(12) United States Patent
Dageville et al.

(10) Patent No.: US 11,055,291 B2
(45) Date of Patent: *Jul. 6, 2021

(54) GENERATING DATA STRUCTURES FOR STORING DATABASE METADATA

(71) Applicant: Snowflake Inc., San Mateo, CA (US)

(72) Inventors: Benoit Dageville, San Mateo, CA (US); Yi Fang, Kirkland, WA (US); Martin Hentschel, Berlin (DE); Ashish Motivala, Foster City, CA (US); Spyridon Triantafyllis, Belmont, CA (US); Yizhi Zhu, Bellevue, WA (US)

(73) Assignee: Snowflake Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/086,275

(22) Filed: Oct. 30, 2020

(65) Prior Publication Data

US 2021/0049178 A1 Feb. 18, 2021

Related U.S. Application Data

(63) Continuation of application No. 16/863,627, filed on Apr. 30, 2020, now Pat. No. 10,866,955, which is a
(Continued)

(51) Int. Cl.
*G06F 16/2455* (2019.01)
*G06F 16/23* (2019.01)
(Continued)

(52) U.S. Cl.
CPC ...... *G06F 16/24558* (2019.01); *G06F 16/221* (2019.01); *G06F 16/2282* (2019.01);
(Continued)

(58) Field of Classification Search
CPC ......... G06F 17/30486; G06F 17/30584; G06F 17/30445; G06F 17/30463; G06F 17/30466
(Continued)

(56) References Cited

U.S. PATENT DOCUMENTS 10,810,232 B2 10/2020 Motivala et al.
10,866,955 B2 12/2020 Dageville et al.
(Continued)

FOREIGN PATENT DOCUMENTS

WO WO-2020/172614 A1 8/2020

OTHER PUBLICATIONS

U.S. Appl. No. 16/283,431, filed Feb. 22, 2019, Multi-Level Metadata in Database Systems.
(Continued)

*Primary Examiner* — Hung T Vy
(74) *Attorney, Agent, or Firm* — Schwegman Lundberg & Woessner, P.A.

(57) ABSTRACT

The subject technology generates a first data structure including first metadata and a second data structure including second metadata, the first metadata corresponding to a set of micro-partitions, the second metadata for a grouping of the first metadata, the second data structure including information associating the second metadata to the first metadata. The subject technology stores the first data structure and the second data structure in storage as a first file and a second file. The subject technology stores third metadata for a table, the third metadata comprising: cumulative table metadata comprising global information about a plurality of micro-partitions of the table, the cumulative table metadata being stored in a metadata micro-partition associated with the table.

30 Claims, 21 Drawing Sheets

Related U.S. Application Data continuation-in-part of application No. 16/283,431, filed on Feb. 22, 2019, now Pat. No. 10,977,278.

(60) Provisional application No. 62/981,858, filed on Feb. 26, 2020.

(51) Int. Cl.
*G06F 16/2457* (2019.01)
*G06F 16/22* (2019.01)
*G06F 16/2458* (2019.01)
*G06F 16/27* (2019.01)

(52) U.S. Cl.
CPC ...... *G06F 16/2379* (2019.01); *G06F 16/2455* (2019.01); *G06F 16/2458* (2019.01); *G06F 16/24552* (2019.01); *G06F 16/24573* (2019.01); *G06F 16/278* (2019.01)

(58) Field of Classification Search
USPC .......................................................... 707/769
See application file for complete search history.

(56) References Cited

U.S. PATENT DOCUMENTS

| | | | |
|---|---|---|---|
| 10,909,121 | B2 | 2/2021 | Dageville et al. |
| 10,977,278 | B2 | 4/2021 | Motivala et al. |
| 2015/0220400 | A1 | 8/2015 | Resch et al. |
| 2017/0103116 | A1* | 4/2017 | Hu .................... G06F 16/2471 |
| 2017/0228166 | A1 | 8/2017 | Zhang et al. |
| 2018/0068008 | A1 | 3/2018 | Cruanes et al. |
| 2018/0232417 | A1 | 8/2018 | Das et al. |
| 2019/0163754 | A1 | 5/2019 | Huang et al. |
| 2020/0073803 | A1 | 3/2020 | Olszewski et al. |
| 2020/0272628 | A1 | 8/2020 | Dageville et al. |
| 2020/0272637 | A1 | 8/2020 | Motivala et al. |
| 2020/0272638 | A1 | 8/2020 | Motivala et al. |
| 2020/0301929 | A1 | 9/2020 | Dageville et al. |
| 2021/0019334 | A1 | 1/2021 | Motivala et al. |
| 2021/0049179 | A1 | 2/2021 | Dageville et al. |

OTHER PUBLICATIONS

U.S. Appl. No. 16/775,092 U.S. Pat. No. 10,810,232, filed Jan. 28, 2020, Multi-Level Metadata in Database Systems.
U.S. Appl. No. 17/062,859, filed Oct. 5, 2020, Storing Database Metadata in Multiple Levels.
U.S. Appl. No. 16/863,831 U.S. Pat. No. 10,909,121, filed Apr. 30, 2020, Storing Multi-Level Metadata in Database Systems.
U.S. Appl. No. 16/863,627 U.S. Pat. No. 10,866,955, filed Apr. 30, 2020, Storing Multi-Level Metadata in Database Systems.
U.S. Appl. No. 17/086,279, filed Oct. 30, 2020, Storing Metadata Using Data Structures in Database Systems.
U.S. Appl. No. 17/123,551, filed Dec. 16, 2020, Multi-Level Data for Database Systems.
"U.S. Appl. No. 16/283,431, Non-Final Office Action dated Jun. 25, 2020", 18 pgs.
"U.S. Appl. No. 16/283,431, Notice of Allowance dated Dec. 16, 2020", 7 pgs.
"U.S. Appl. No. 16/283,431, Preliminary Amendment filed Jan. 28, 2020", 15 pgs.
"U.S. Appl. No. 16/283,431, Response filed Sep. 24, 2020 to Non-Final Office Action dated Jun. 25, 2020", 19 pgs.
"U.S. Appl. No. 16/775,092, Non-Final Office Action dated Mar. 30, 2020", 15 pgs.
"U.S. Appl. No. 16/775,092, Notice of Allowance dated Sep. 4, 2020", 8 pgs.
"U.S. Appl. No. 16/775,092, Response filed Jun. 23, 2020 to Non-Final Office Action dated Mar. 30, 2020", 15 pgs.
"U.S. Appl. No. 16/863,627, Non-Final Office Action dated Jul. 7, 2020".
"U.S. Appl. No. 16/863,627, Notice of Allowance dated Oct. 28, 2020", 7 pgs.
"U.S. Appl. No. 16/863,627, Response filed Oct. 7, 2020 to Non-Final Office Action dated Jul. 7, 2020", 14 pgs.
"U.S. Appl. No. 16/863,831, Non-Final Office Action dated Jun. 8, 2020", 11 pgs.
"U.S. Appl. No. 16/863,831, Notice of Allowance dated Nov. 23, 2020'", 7 pgs.
"U.S. Appl. No. 16/863,831, Response Filed Sep. 1, 2020 to Non-Final Office Action dated Jun. 8, 2020", 14.
"U.S. Appl. No. 17/062,859, Non-Final Office Action dated Nov. 23, 2020", 7 pgs.
"U.S. Appl. No. 17/062,859, Notice of Allowance dated Mar. 11, 2021", 7 pgs.
"U.S. Appl. No. 17/062,859, Response filed Feb. 23, 2021 to Non-Final Office Action dated Nov. 23, 2020", 11 pgs.
"U.S. Appl. No. 17/086,279, Non-Final Office Action dated Dec. 21, 2020", 12 pgs.
"International Application Serial No. PCT/US2020/019343, International Search Report dated May 20, 2020", 2 pgs.
"International Application Serial No. PCT/US2020/019343, Written Opinion dated May 20, 2020", 9 pgs.

\* cited by examiner

GENERATING DATA STRUCTURES FOR STORING DATABASE METADATA

PRIORITY CLAIM

This application a continuation of, and hereby claims priority under 35 U.S.C. § 120 to U.S. Non-Provisional patent application Ser. No. 16/863,627, entitled "STORING MULTI-LEVEL METADATA IN DATABASE SYSTEMS," filed on Apr. 30, 2020, which is a continuation-in-part of U.S. Non-Provisional patent application Ser. No. 16/283,431, filed on Feb. 22, 2019, and claims the benefit of priority of U.S. Provisional Patent Application No. 62/981,858, filed Feb. 26, 2020, each of which is hereby incorporated by reference in its entirety for all purposes.

TECHNICAL FIELD

The present disclosure relates systems, methods, and devices for databases and more particularly relates to storing and maintaining metadata pertaining to database data.

BACKGROUND

Databases are an organized collection of data that enable data to be easily accessed, manipulated, and updated. Databases serve as a method of storing, managing, and retrieving information in an efficient manner. Traditional database management requires companies to provision infrastructure and resources to manage the database in a data center. Management of a traditional database can be very costly and requires oversight by multiple persons having a wide range of technical skill sets.

Traditional relational database management systems (RDMS) require extensive computing and storage resources and have limited scalability. Large sums of data may be stored across multiple computing devices. A server may manage the data such that it is accessible to customers with on-premises operations. For an entity that wishes to have an in-house database server, the entity must expend significant resources on a capital investment in hardware and infrastructure for the database, along with significant physical space for storing the database infrastructure. Further, the database may be highly susceptible to data loss during a power outage or other disaster situations. Such traditional database systems have significant drawbacks that may be alleviated by a cloud-based database system.

A cloud database system may be deployed and delivered through a cloud platform that allows organizations and end users to store, manage, and retrieve data from the cloud. Some cloud database systems include a traditional database architecture that is implemented through the installation of database software on top of a computing cloud. The database may be accessed through a Web browser or an application programming interface (API) for application and service integration. Some cloud database systems are operated by a vendor that directly manages backend processes of database installation, deployment, and resource assignment tasks on behalf of a client. The client may have multiple end users that access the database by way of a Web browser and/or API. Cloud databases may provide significant benefits to some clients by mitigating the risk of losing database data and allowing the data to be accessed by multiple users across multiple geographic regions.

Databases are widely used for data storage and access in computing applications. A goal of database storage is to provide enormous sums of information in an organized manner so that it can be accessed, managed, and updated. In a database, data may be organized into rows, columns, and tables. Different database storage systems may be used for storing different types of content, such as bibliographic, full text, numeric, and/or image content. Further, in computing, different database systems may be classified according to the organization approach of the database. There are many different types of databases, including relational databases, distributed databases, cloud databases, object-oriented and others.

Queries can be executed against database data to find certain data within the database and respond to a question about the database data. A database query extracts data from the database and formats it into a readable form. For example, when a user wants data from a database, the user may write a query in the language required by the database. The query may request specific information from the database. For example, if the database includes information about sales transactions made by a retail store, a query may request all transactions for a certain product during a certain time frame. The query may request any pertinent information that is stored within the database. If the appropriate data can be found to respond to the query, the database has the potential to reveal complex trends and activities. This power can only be harnessed through the use of a successfully executed query.

However, when a database becomes very large and includes vast sums of data, it can be very difficult to respond to a database query. Further to the above example, if the database includes a record of all sales transactions for the retail store over an extensive time period, the database may include multiple tables that each include billions of rows of information divided into hundreds or thousands of columns. If a user requests all transactions for a certain product across the entire history of the database, it can require extensive computing resources and time to scan the entire database to find each of the requested transactions. Databases may further include metadata, or information about the database data, to aid in organizing the database and responding to queries on the database.

Metadata is data information that provides information about other data. For example, metadata about an image file may include information such as the date and time the image was captured, the camera that captured the image, the camera settings when the image was captured, a file size of the image, a name of the image, and so forth. Further for example, metadata about a table in a database may include information such as the minimum value in the table, the maximum value in the table, the number of rows in the table, the number of columns in the table, the type of data stored in the table, the subject of the data stored in the table, and so forth. Metadata has existed as a means for organizing large sums of data for a long time. For example, the traditional card catalogue system used for organizing a large collection of books uses metadata to describe information about each of the books, including author, title, subject, and so forth. Metadata in current systems and methods typically refers to digital formats and includes several different types, including descriptive metadata, structural metadata, administrative metadata, reference metadata, and statistical metadata. The principal purpose of metadata is to help a user or computer processor to find relevant information and discover resources. Metadata helps to organize electronic resources, provide digital identification, and support the archiving and preservation of resources.

Metadata can be useful for responding to a database query. However, particularly in the context of a large database, the metadata itself can become very large and require extensive computing resources and time to just scan the metadata without scanning any of the database data. In certain implementations it can be imperative to employ an organized and efficient metadata structure. Disclosed herein are improved systems, methods, and devices for metadata organization and structural database organization for improving database performance.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
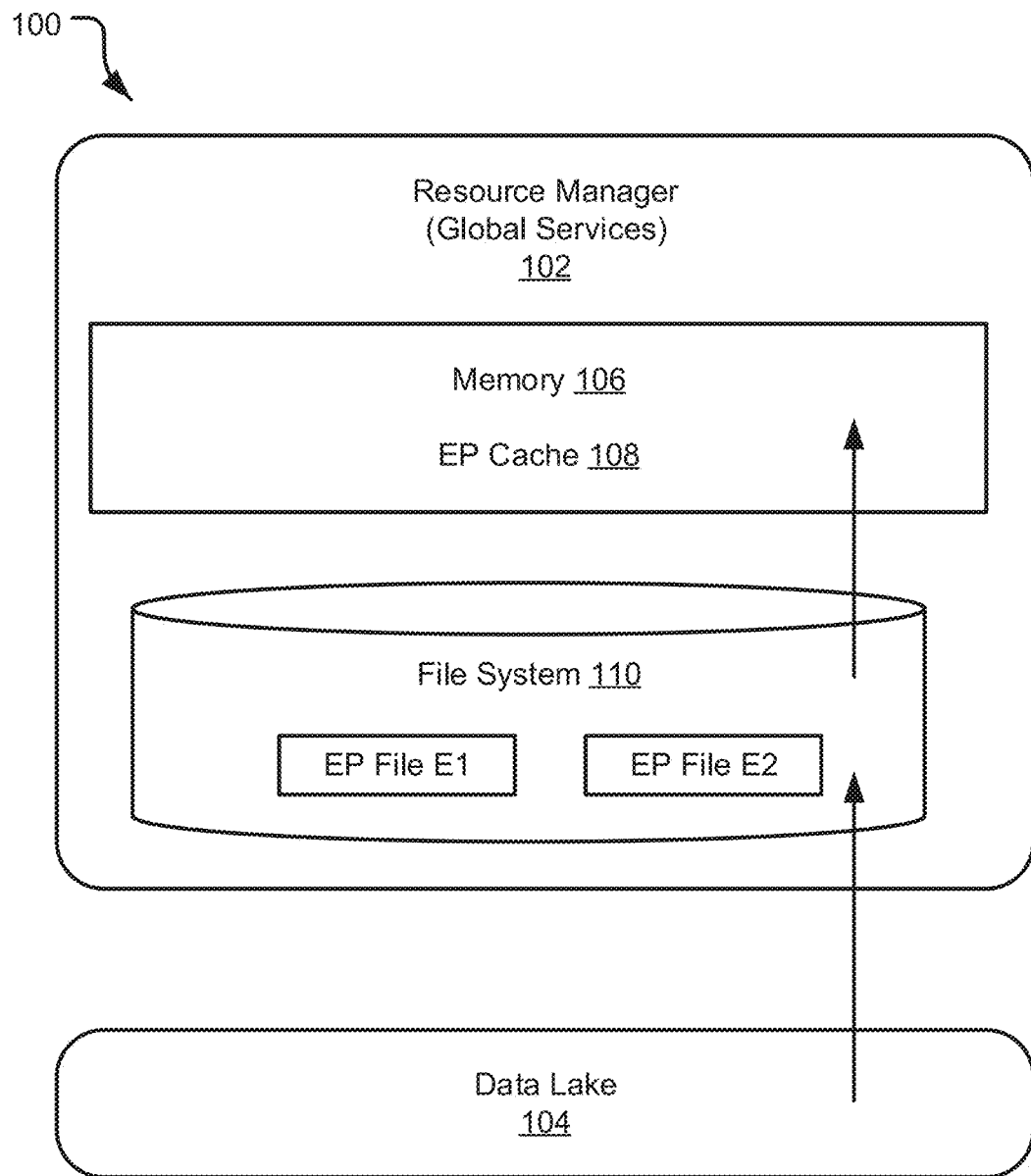
FIG. 1 is a block diagram illustrating a system of ingesting data into a database and generating metadata on the data, according to an example embodiment of the systems and methods described herein.

The present disclosure is directed to systems, methods, and devices for metadata organization. Database systems store and maintain large amounts of metadata. This metadata describes the data that is stored in database tables of customers but is not actually the stored table data. Metadata can get very large, especially if there are large database tables of many customers, Current database systems have severe limitations handling large amounts of metadata.

In an embodiment, a system includes a plurality of shared storage devices collectively storing database data across a plurality of tables that each comprise one or more micro-partitions constituting immutable storage devices that cannot be updated in-place. The system includes a resource manager configured to manage the storage of database data stored in a table across one or more of the plurality of shared storage devices. The resource manager is configured to manage the storage of metadata for the table. The metadata includes a column expression property with information about data stored in a column, a micro-partition expression property with information about data stored in a micro-partition, a grouping expression property with information about data stored in two or more micro-partitions, and cumulative table metadata with global information about all micro-partitions of the table.

The disclosure relates to the organization of metadata that includes information about tables in a database. A table of a database may include many rows and columns of data. One table may include millions of rows of data and may be very large and difficult to store or read. A very large table may be divided into multiple smaller files which may be referred to herein as "micro-partitions." For example, one table may be divided into six distinct micro-partitions, and each of the six micro-partitions may include a portion of the data in the table. Dividing the table data into multiple micro-partitions helps to organize the data and to find where certain data is located within the table.

An analogy to the micro-partitions of the table may be different storage buildings within a storage compound. In the analogy, the storage compound is similar to the table, and each separate storage building is similar to a micro-partition. Hundreds of thousands of items are stored throughout the storage compound, Because so many items are located at the storage compound, it is necessary to organize the items across the multiple separate storage buildings. The items may be organized across the multiple separate storage buildings by any means that makes sense. For example, one storage building may store clothing, another storage building may store household goods, another storage building may store toys, and so forth. Each storage building may be labeled so that the items are easier to find. For example, if a person wants to find a stuffed bear, the person will know to go to the storage building that stores toys. The storage building that stores toys may further be organized into rows of shelving. The toy storage building may be organized so that all stuffed animals are located on one row of shelving. Therefore, the person looking for the stuffed bear may know to visit the building that stores toys and may know to visit the row that stores stuffed animals. Further to the analogy with database technology, each row of shelving in the storage building of the storage compound may be similar to a column of database data within a micro-partition of the table. The labels for each storage building and for each row of shelving are similar to metadata in a database context.

Similar to the analogy of the storage compound, the micro-partitions disclosed herein can provide considerable benefits for managing database data, finding database data, and organizing database data. Each micro-partition organizes database data into rows and columns and stores a portion of the data associated with a table. One table may have many micro-partitions. The partitioning of the database data among the many micro-partitions may be done in any manner that makes sense for that type of data. For example, if the database client is a credit card provider and the data is credit card transactions. The table may include columns such as credit card number, account member name, merchant name, date of card transaction, time of card transaction, type of goods or services purchased with card, and so forth. The table may include millions and millions of credit card transactions spanning a significant time period, and each credit card transaction may be stored in one row of the table. Because the table includes so many millions of rows, the table may be partitioned into micro-partitions. In the case of credit card transactions, it may be beneficial to split the table based on time. For example, each micro-partition may represent one day or one week of credit card transactions. It should be appreciated that the table may be partitioned into micro-partitions by any means that makes sense for the database client and for the type of data stored in the table. The micro-partitions provide significant benefits for managing the storage of the millions of rows of data in the table, and for finding certain information in the table.

A query may be executed on a database table to find certain information within the table. Further to the above example of the credit card transactions, and query may seek to find all transactions for a certain vendor across a certain time period. For example, a database client (in this case, the credit card provider) may query its database and ask for a report of all credit card transactions that occurred at Retail Store A in the months of January, April, and May. To respond to the query, a resource manager (see 102) must scan the table to find each of the applicable credit card transactions. The table may include millions and millions of rows, and it would be very time consuming and it would require significant computing resources for the resource manager to scan the entire table. The micro-partition organization along with the systems, methods, and devices for database metadata storage as disclosed herein provide significant benefits by shortening the query response time and reducing the amount of computing resources that are required for responding to the query.

Further to the above example, the resource manager must respond to the query that requested all credit card transactions at Retail Store A in the months of January, April, and May. The resource manager may find the cells of database data by scanning database metadata. The multiple level database metadata as described herein (see e.g. FIG. 3) enable the resource manager to quickly and efficiently find the correct data to respond to the query. The resource manager may find the correct table by scanning table metadata (see 302) across all the multiple tables in the client's database. The resource manager may find a correct grouping of micro-partitions by scanning multiple grouping expression properties (see 314a-314d) across the identified table. The grouping expression properties 314a-314d include information about database data stored in each of the micro-partitions within the grouping. The resource manager may find a correct micro-partition by scanning multiple micro-partition expression properties within the identified grouping of micro-partitions. The resource manager may find a correct column by scanning one or more column expression properties within the identified micro-partition. The resource manager may find the correct row(s) by scanning the identified column within the identified micro-partition. Further to the example involving the credit card transactions, the resource manager may scan multiple tables to find a table that includes credit card transactions. The resource manager may scan the grouping expression properties to find groupings that have data for the months of January, April, and/or May. For example, the resource manager finds a grouping that includes credit card transactions for the month of January. The resource manager reads the micro-partition expression properties for that grouping to find one or more individual micro-partitions that include transactions for the month of January. The resource manager reads column expression properties within each of the identified individual micro-partitions. The resource manager scans the identified columns to find the applicable rows that have a credit card transaction for Retail Store A in the month of January (or April or May).

The unique metadata organization structures used herein may be applied to database "pruning" based on the metadata. The metadata organization may lead to extremely granular selection of pertinent micro-partitions of a table. Pruning based on metadata is executed to determine which portions of a table of a database include data that is relevant to a query. Pruning is used to determine which micro-partitions or groupings of micro-partitions are relevant to the query, and then scanning only those relevant micro-partitions and avoiding all other non-relevant micro-partitions. Further to the above example, the resource manager must respond to the query that requested all credit card transactions at Retail Store A in the months of January, April, and May. Pruning based on metadata would include scanning the metadata to determine which micro-partitions or groupings of micro-partitions included credit card transactions at Retail Store A in the months of January, April, and/or May. The pruning results in finely selecting only the relevant micro-partitions and disregarding all non-relevant micro-partitions. In some instances, the non-relevant micro-partitions may number in the millions or even hundreds of millions. By pruning the table based on the metadata, the system can save significant time and resources by avoiding all non-relevant micro-partitions when responding to the query. After pruning, the system will scan the relevant micro-partitions and select all rows that include a credit card transaction at Retail Store A in January, April, or May.

As illustrated in the above example, the metadata organization as disclosed herein provides significant benefits to hasten the query response time and enable the resource manager to quickly identify the correct table, the correct grouping of micro-partitions, the correct micro-partition, the correct column, and the correct row to respond to a query. The novel metadata storage as disclosed herein provides a multiple level metadata data structure for maintaining information about micro-partitions in a table of a database.

To provide further background to the disclosures provided herein, a database table is a collection of related data held in a structured format within the database and may include columns and rows. A database table may be altered in response to a data manipulation (DML) command such as an insert command, a delete command, an update command, a merge command, and so forth. Such modifications may be referred to as a transaction that occurred on the database table. In an embodiment, each transaction includes a timestamp indicating when the transaction was received and/or when the transaction was fully executed. In an embodiment, a transaction includes multiple alterations made to a table, and such alterations may impact one or more micro-partitions in the table. In an embodiment, data may be continuously ingested, or may be ingested at determined time intervals, and the ingestion of data into the database is a transaction occurring on the database. In an embodiment, each time a transaction is executed on the table, a new table version is generated that includes one or more new micro-partitions. Further, each time a transaction is executed on the table, or after a threshold number of transactions are executed on the table, the metadata for the table may need to be updated to reflect the new data stored in the table.

A database table may store data in a plurality of micro-partitions, wherein the micro-partitions are immutable storage devices. When a transaction is executed on a such a table, all impacted micro-partitions are recreated to generate new micro-partitions that reflect the modifications of the transaction. After a transaction is fully executed, any original micro-partitions that were recreated may then be removed from the database. A new version of the table is generated after each transaction that is executed on the table. The table may undergo many versions over a time period if the data in the table undergoes many changes, such as inserts, deletes, updates, and/or merges. Each version of the table may include metadata indicating what transaction generated the table, when the transaction was ordered, when the transaction was fully executed, and how the transaction altered one or more rows in the table. The disclosed systems, methods, and devices for low-cost table versioning may be leveraged to provide an efficient means for updating table metadata after one or more changes (transactions) have occurred on the table.

In one embodiment, metadata is stored and maintained on non-mutable storage services (may be referred to herein as micro-partitions) in the cloud. These storage services may include, for example, Amazon S3®, Microsoft Azure Blob Storage®, and Google Cloud Storage®. Many of these services do not allow to update data in-place (i.e., are non-mutable or immutable). Data micro-partitions may only be added or deleted, but never updated. In one embodiment, storing and maintaining metadata on these services requires that, for every change in metadata, a metadata micro-partition is added to the storage service. These metadata micro-partitions may be periodically consolidated into larger "compacted" or consolidated metadata micro-partitions in the background.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular selection of the micro-partitions to be scanned, which can be comprised of millions, or even hundreds of millions, of micro-partitions. This granular selection process may be referred to herein as "pruning" based on metadata. Pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

Current database systems store metadata in mutable storage devices and services, including main memory, micro-partition systems, and key-value stores. These devices and services allow the metadata to be updated in-place. If a data record changes, it may be updated with the new information. The old information is overwritten. This allows databases to easily maintain mutable metadata by updating metadata in-place. However, these storage devices and services have limitations. The limitations are at least two-fold. First, mutable storage devices like main memory and micro-partition systems have a hard limit in terms of storage capacity. If the size of the metadata exceeds these limits, it is impossible to store more metadata there. Second, mutable storage services like key-value stores perform poorly when reading large volumes of metadata. Reading data is performed using range scans, which take a long time to finish. In practice, range scans can take many minutes or even approach an hour to complete in large scale deployments.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description to provide a thorough understanding of the embodiments disclosed herein, some embodiments may be practiced without some or all these details. Moreover, for the purpose of clarity, certain technical material that is known in the related art has not been described in detail to avoid unnecessarily obscuring the disclosure.

Disclosed herein are systems and methods for improved metadata storage and management that include storing metadata in immutable (non-mutable) storage in a multi-level storage architecture. In an embodiment, a system includes means for storing data in a table of a database, wherein the table includes one or more micro-partitions each having rows and columns. The system includes means for storing table metadata. The table metadata includes a cumulative expression property including global information about a plurality of expression properties. The table metadata includes the plurality of expression properties that are associated with the cumulative expression property, and each of the plurality of expression properties includes information about one or more columns stored within a micro-partition of the one or more micro-partitions of the database.

An expression property is some information about the one or more columns stored within one or more micro-partitions. In an embodiment, multiple expression properties are stored that each pertain to a single column of a single micro-partition. In an alternative embodiment, one or more expression properties are stored that pertain to multiple columns and/or multiple micro-partitions and/or multiple tables. The expression property is any suitable information about the database data and/or the database itself. In an embodiment, the expression property includes one or more of: a summary of database data stored in a column, a type of database data stored in a column, a minimum and maximum for database data stored in a column, a null count for database data stored in a column, a distinct count for database data stored in a column, a structural or architectural indication of how data is stored, and so forth.

A cumulative expression property includes global information about data stored in a plurality of expression properties. Similar to the expression property, the cumulative expression property includes any suitable information about database data and/or the database itself. The cumulative expression property may store a summary of the information stored within the plurality of expression properties to which it is associated. In an embodiment, the cumulative expression property includes one or more of: a summary of the data stored across each of one or more micro-partitions of a table, a type of data stored in one or more columns across each of one or more micro-partitions of a table, a global minimum and maximum for data stored across each of one or more micro-partitions of a table, and so forth.

As used herein, immutable or non-mutable storage includes storage where data cannot, or is not permitted, to be overwritten or updated in-place. For example, changes to data that is located in a cell or region of storage media may be stored as a new micro-partition in a different, time-stamped, cell or region of the storage media. Mutable storage may include storage where data is or permitted to be overwritten or updated in place. For example, data in a given cell or region of the storage media can be overwritten when there are changes to the data relevant to that cell or region of the storage media.

In one embodiment, metadata is stored and maintained on non-mutable storage services in the cloud. These storage services may include, for example, Amazon S3®, Microsoft Azure Blob Storage®, and Google Cloud Storage®. Many of these services do not allow to update data in-place (i.e., are non-mutable or immutable). Data micro-partitions may only be added or deleted, but never updated. In one embodiment, storing and maintaining metadata on these services requires that, for every change in metadata, a metadata micro-partition is added to the storage service. These metadata micro-partitions may be periodically consolidated into larger "compacted" or consolidated metadata micro-partitions in the background. A metadata micro-partition version may be stored to indicate metadata micro-partitions that correspond to the compacted or consolidated version versus the pre-compaction or pre-consolidation version of metadata micro-partitions. In one embodiment, consolidation of mutable metadata in the background to create new versions of metadata micro-partitions may allow for deletions of old metadata micro-partitions and old data micro-partitions.

By using immutable storage, such as cloud storage, embodiments allow storage capacity to not have a hard limit. Using storage services in the cloud allows for virtually unlimited amounts of metadata. Reading large amounts of metadata may be much faster because metadata micro-partitions may be downloaded in parallel, including prefetching of micro-partitions. Metadata micro-partitions may also be cached on a local micro-partition system so that they are not downloaded more than once. In practical usage scenarios and testing, the systems and methods as disclosed herein can provide a 200-fold performance improvement when reading metadata from storage services in the cloud when compared to reading the same metadata information from mutable storage like a key-value store.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description to provide a thorough understanding of the embodiments disclosed herein, some embodiments may be practiced without some or all these details. Moreover, for the purpose of clarity, certain technical material that is known in the related art has not been described in detail to avoid unnecessarily obscuring the disclosure.

Now turning to the figures, FIG. 1 is a schematic diagram of system 100 for ingesting data into a database and generating metadata on the data. The system 100 includes a resource manager 102 (may alternatively be referred to as global services) and constitutes a database services manager. The resource manager 102 includes memory 106 and an EP (expression property) cache 108. The EP cache 108 is cache storage for storing metadata about database data that is managed and executed upon by the resource manager 102 and stored in a file system 110. The resource manager 102 is further in communication with a file system 110 that may include a plurality of shared storage devices collectively storing database data and metadata pertaining to the database data. The file system 110 includes EP files (expression property files), wherein each of the EP files store a collection of expression properties about corresponding data. The EP files illustrated in FIG. 1 include the example EP file E1 and EP file E2. The system 100 may ingest data from a data lake 104, such as cloud service provider. In an embodiment, the EP files are determined at the data lake 104 level and are ingested into the file system 110 predetermined. In an alternative embodiment, database data is ingested at the data lake 104 and the EP files are determined by the resource manager 102. In an embodiment, the resource manager 102 generates metadata as described further herein. Specifically, the resource manager include a background service that performs consolidation, or compaction, which can also generate compacted EP files, as well as 2-level EP files as described further herein.

Figure 2:
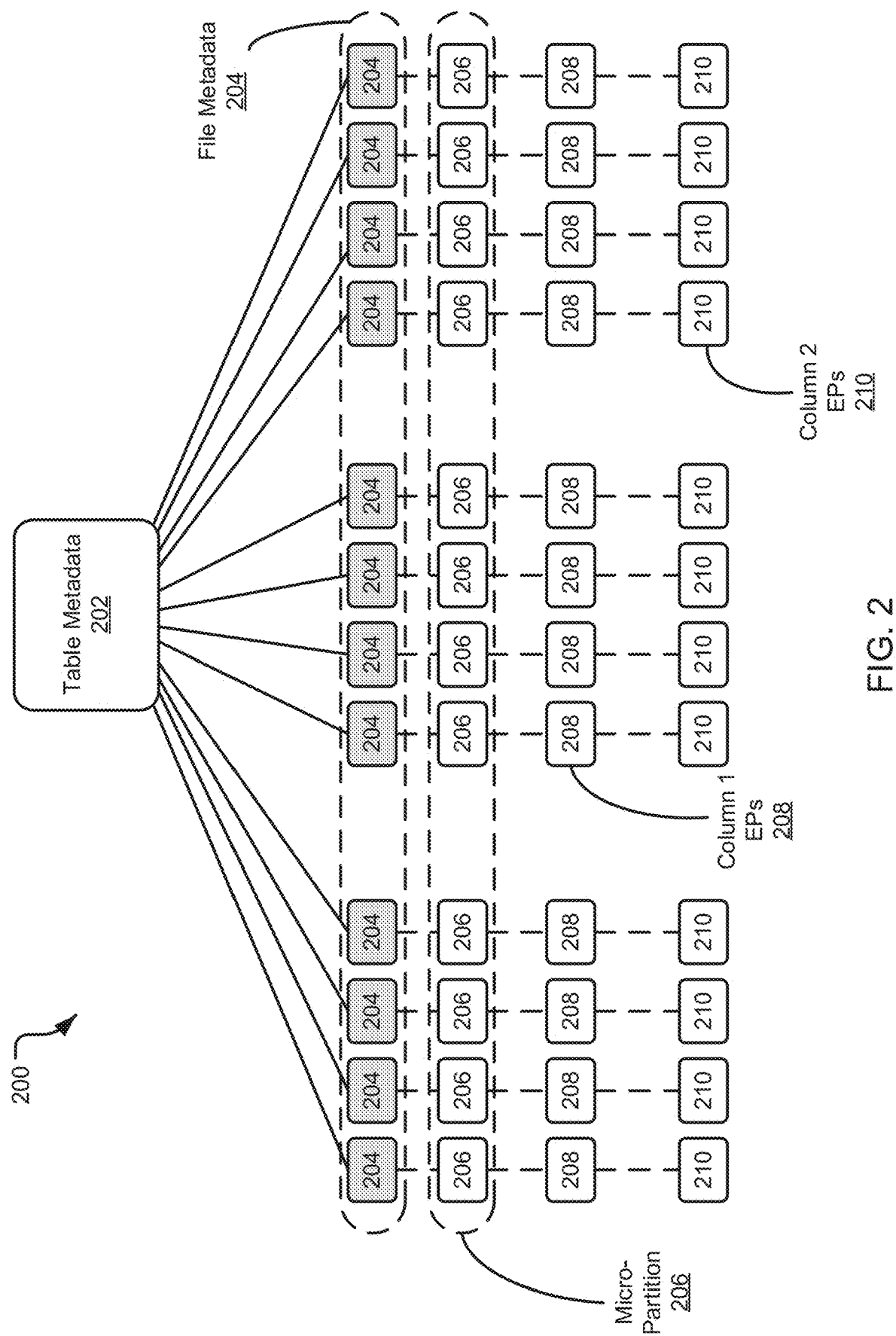
FIG. 2 is a block diagram of a system for storage of database metadata, according to an example embodiment of the systems and methods described herein.

FIG. 2 is a schematic diagram of a data structure 200 for storage of database metadata. The data structure 200 may be constructed from metadata micro-partitions as described in FIG. 10 and may be stored in a metadata cache memory. The data structure 200 includes table metadata 202 pertaining to database data stored across a table of the database. The table may be composed of multiple micro-partitions serving as immutable storage devices that cannot be updated in-place. Each of the multiple micro-partitions may include numerous rows and columns making up cells of database data. The table metadata 202 may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML statement such as an insert, delete, merge, and/or update command. Each time a DML statement is executed on the table, and a new table version is generated, one or more new micro-partitions may be generated that reflect the DML statement.

The table metadata 202 includes global information about the table of a specific version. The data structure 200 further includes file metadata 204 that includes metadata about a micro-partition of the table. The terms file and micro-partition may each refer to a subset of database data and may be used interchangeably in some embodiments. The file metadata 204 includes information about a micro-partition 206 of the table. The micro-partition 206 illustrated in FIG. 2 includes database data and is not part of the metadata storage. Further, metadata may be stored for each column of each micro-partition 206 of the table. The metadata pertaining to a column of a micro-partition 206 may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition 206 of the table may include one or more expression properties. As illustrated in the exemplary embodiment shown in FIG. 1, the table metadata 202 includes expression properties for column 1 of a micro-partition 206 at 208 and expression properties for column 2 of a micro-partition 206 at 210. It should be appreciated that the table may include any number of micro-partitions, and each micro-partition may include any number of columns. The micro-partitions may have the same or different columns and may have different types of columns storing different information.

Figure 3:
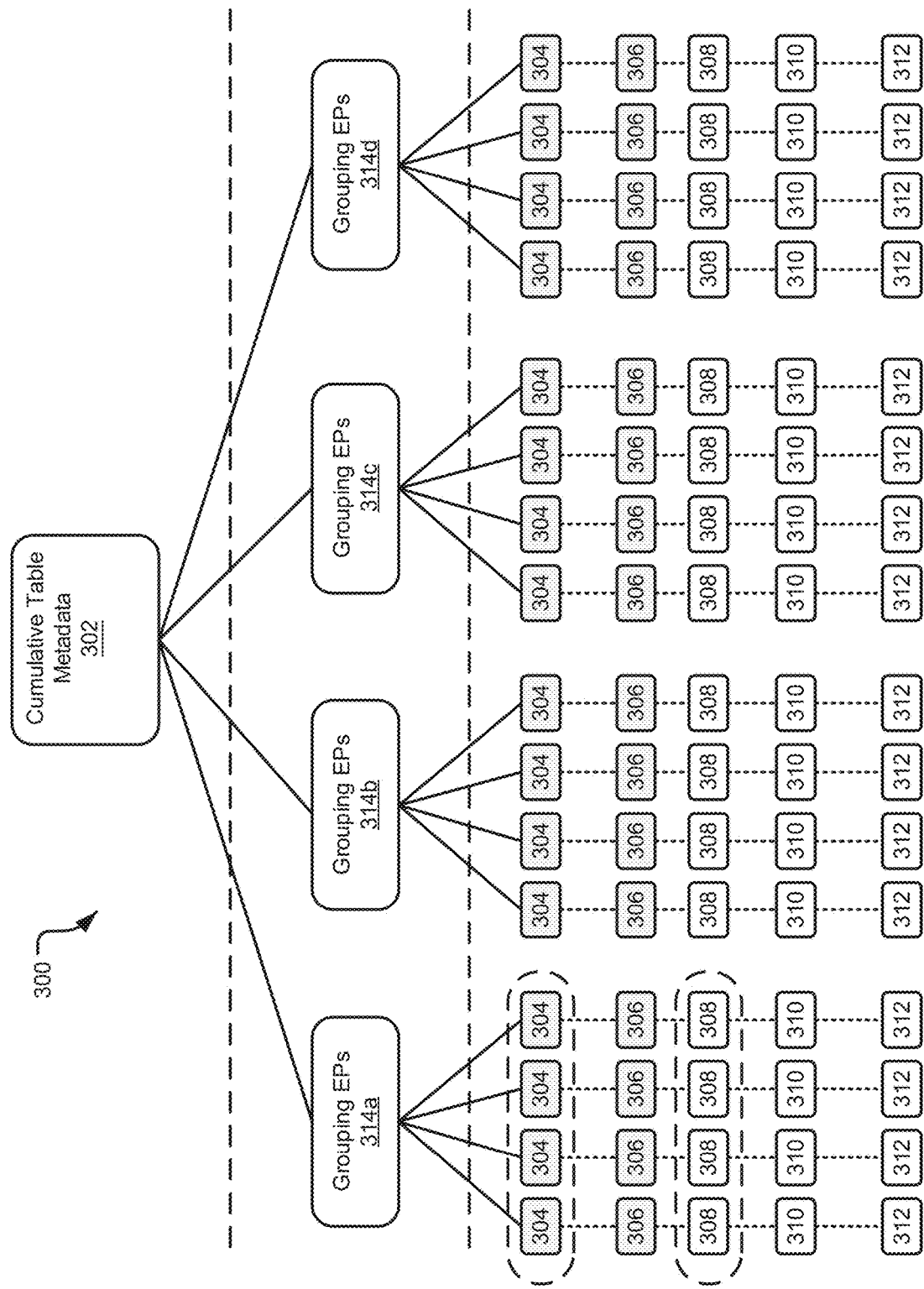
FIG. 3 is a block diagram of a system for storage of database metadata, according to an example embodiment of the systems and methods described herein.

FIG. 3 is a schematic diagram of a data structure 300 for storage of database metadata, including in persistent storage and cache storage. The data structure 300 includes cumulative table metadata 302 including information about a table of the database. The table may include a plurality of files or micro-partitions that may each include a number of columns and rows storing database data. The cumulative table metadata 302 includes global information about the table and may include summary information stored in each of a plurality of grouping expression properties 314a, 314b, 314c, and 314d (may be collectively referenced herein as "314"). The grouping expression properties 314a-314d include aggregated micro-partition statistics, cumulative column properties, and so forth about a micro-partition 306 or a collection of micro-partitions of the table. It should be appreciated that the micro-partitions 306 illustrated in FIG. 3 may each contain a different subset of the data stored in the table and may include the same columns or may include different columns storing different types of information. The micro-partitions 306 of the table each include one or more columns and may each have the same types of columns or different types of columns. An expression property may be stored for each column of each micro-partition 306 of the table, or for a collection of micro-partitions 306 of the table as illustrated in FIG. 3. The data structure 300 includes micro-partition statistics 304 for each micro-partition 306 of the table (the micro-partition statistics 304 may alternatively be referred to herein as "micro-partition expression properties"). The micro-partition statistics 304 may include a minimum/maximum data point for the corresponding micro-partition 306, a type of data stored in the corresponding micro-partition, a micro-partition structure of the corresponding micro-partition 306, and so forth. As illustrated in FIG. 3, a column 1 expression property 308 is stored for the first column in each of the different micro-partitions 306. Further, a column 2 expression property 310 is stored for the second column in each of the different micro-partitions 306. Further, a column 3 expression property 312 is stored for the third column in each of the different micro-partitions. It should be appreciated that each of the micro-partitions may include any suitable number of columns, and that an expression property may be stored for each of the columns, or for any suitable number of the columns, stored in each micro-partition of the table. The column 1 expression properties 308, the column 2 expression properties 310, and the column 3 expression properties 312, along with any additional column expression properties that may be included as deemed appropriate, may be stored as part of a metadata micro-partition. A metadata micro-partition may be persisted in immutable storage and the grouping expression properties 314a-314d may also be stored within a metadata micro-partition in immutable storage. A metadata manager may maintain all metadata micro-partitions, including metadata micro-partitions comprising the grouping expression properties 314a-314d, and micro-partition statistics 304, and/or the column expression properties 308-312.

The cumulative table metadata 302 includes global information about all micro-partitions within the applicable table. For example, the cumulative table metadata 302 may include a global minimum and global maximum for the entire table, which may include millions or even hundreds of millions of micro-partitions. The cumulative table metadata 302 may include any suitable information about the data stored in the table, including, for example, minimum/maximum values, null count, a summary of the database data collectively stored across the table, a type of data stored across the table, a distinct for the data stored in the table, and so forth.

The grouping expression properties 314a-314d include information about database data stored in an associated grouping of micro-partitions. For example, an example grouping expression property is associated with micro-partitions numbered 3040 thru 3090 such that the example grouping expression property is associated with fifty different micro-partitions. The example grouping expression property includes information about those fifty different micro-partitions. One grouping expression property of the grouping expression properties 314a-314d may include any suitable information about the micro-partitions with which it is associated. For example, a grouping expression property may include a global minimum/maximum for the collective set of micro-partitions, a minimum/maximum for each of the micro-partitions within the grouping, a global null count, a null count for each of the micro-partitions within the grouping, a global summary of data collectively stored across the grouping of micro-partitions, a summary of data stored in each of the micro-partitions in the grouping, and so forth. The grouping expression property may include global information for all micro-partitions within the grouping of micro-partitions that is associated with the grouping expression property, and it may further include information specific to each of the micro-partitions within the associated grouping.

The metadata structure disclosed in FIG. 3 provides increased granularity in cumulative table metadata 302 over other embodiments such as the embodiment illustrated in FIG. 2. The grouping expression properties provide valuable global metadata pertaining to a collection of micro-partitions 306 of the database. Further, each of the columnar expression properties 308, 310, 312 provide valuable information about a column of a micro-partition 306 of the table.

The metadata structures disclosed herein, including the data structure 300 shown in FIG. 3, increases efficiency when responding to database queries. A database query may request any collection of data from the database and may be used for created advanced analyses and metrics about the database data. Some queries, particularly for a very large database, can be extremely costly to run both in time and computing resources. When it is necessary to scan metadata and/or database data for each file or micro-partition of each table of a database, it can take many minutes or even hours to respond to a query. In certain implementations this may not be an acceptable use of computing resources. The data structure 300 disclosed herein provides increased metadata granularity and enables multi-level pruning of database data. During compilation and optimization of a query on the database, a processor may scan the cumulative table metadata 302 to determine if the table includes information pertaining to the query. In response to determining, based on the cumulative table metadata 302, that the table includes information pertaining to the query, the processor may scan each of the grouping expression properties 314a-314d to determine which grouping of micro-partitions of the table include information pertaining to the query. In response to determining, based on a first cumulative expression property, that a first grouping of micro-partitions does not include information pertaining to the query, the processor may discontinue database scanning of that first grouping of micro-partitions. In response to determining, based on a second cumulative expression property, that a second grouping of micro-partitions includes information pertaining to the query, the processor may proceed to scan expression properties for that second grouping of micro-partitions. The processor may efficiently determine which micro-partitions include pertinent data and which columns of which micro-partitions include pertinent data. The processor may proceed to scan only the relevant column(s) and micro-partition(s) that include information relevant to a database query. This provides a cost efficient means for responding to a database query by way of multi-level pruning based on multi-level table metadata.

Further to increase the cost efficiency of database queries, a resource manager (may also be referred to as a "global services") may store the cumulative table metadata 302 in a cache for faster retrieval. Metadata for the database may be stored in a metadata store separate and independent of a plurality of shared storage devices collectively storing database data. In a different embodiment, metadata for the database may be stored within the plurality of shared storage devices collectively storing database data. In various embodiments, metadata may be stored in metadata-specific micro-partitions that do not include database data, and/or may be stored within micro-partitions that also include database data. The metadata may be stored across disk storage, such as the plurality of shared storage devices, and it may also be stored in cache within the resource manager.

Figure 4A:
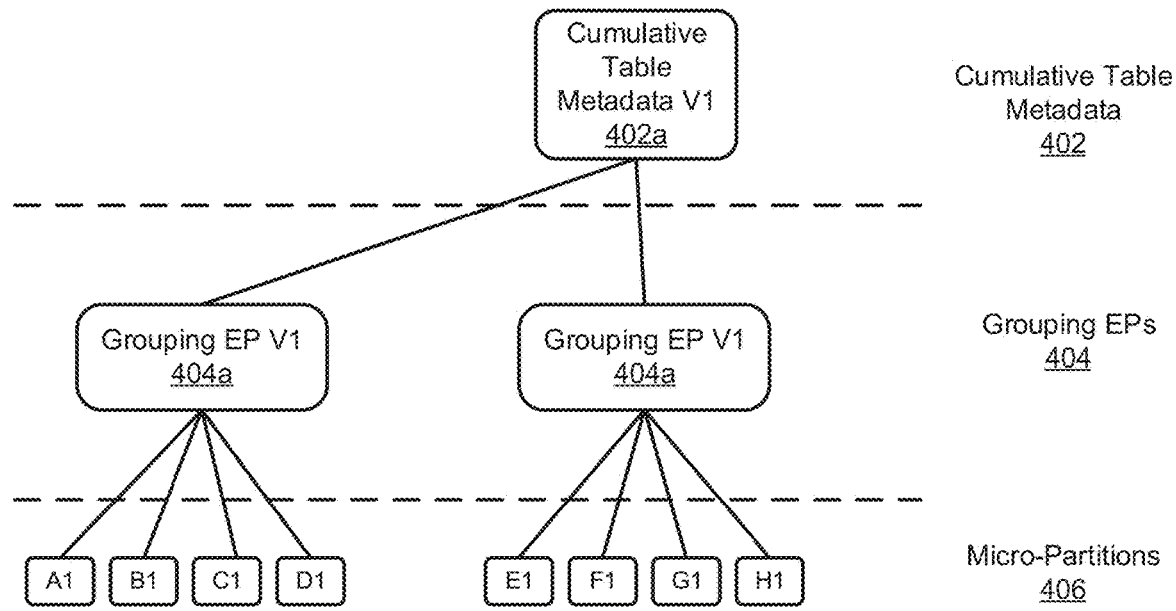
FIG. 4A, FIG. 4B, and FIG. 4C are block diagrams illustrating the generation of table metadata across multiple versions of a table of a database, according to an example embodiment of the systems and methods described herein.
Figure 4B:
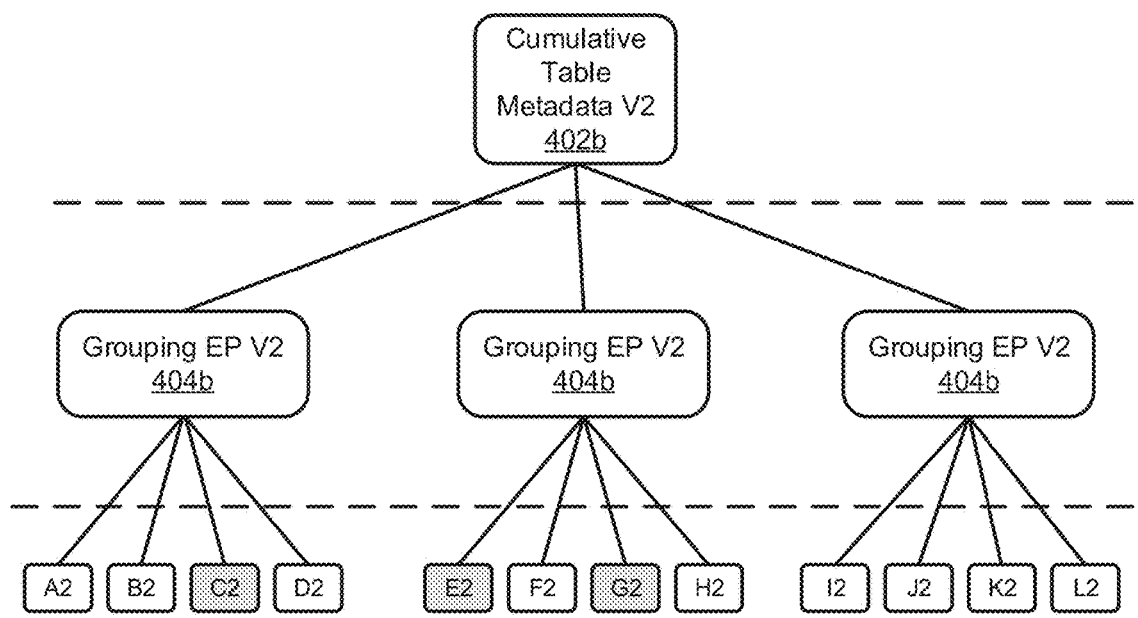
Figure 4C:
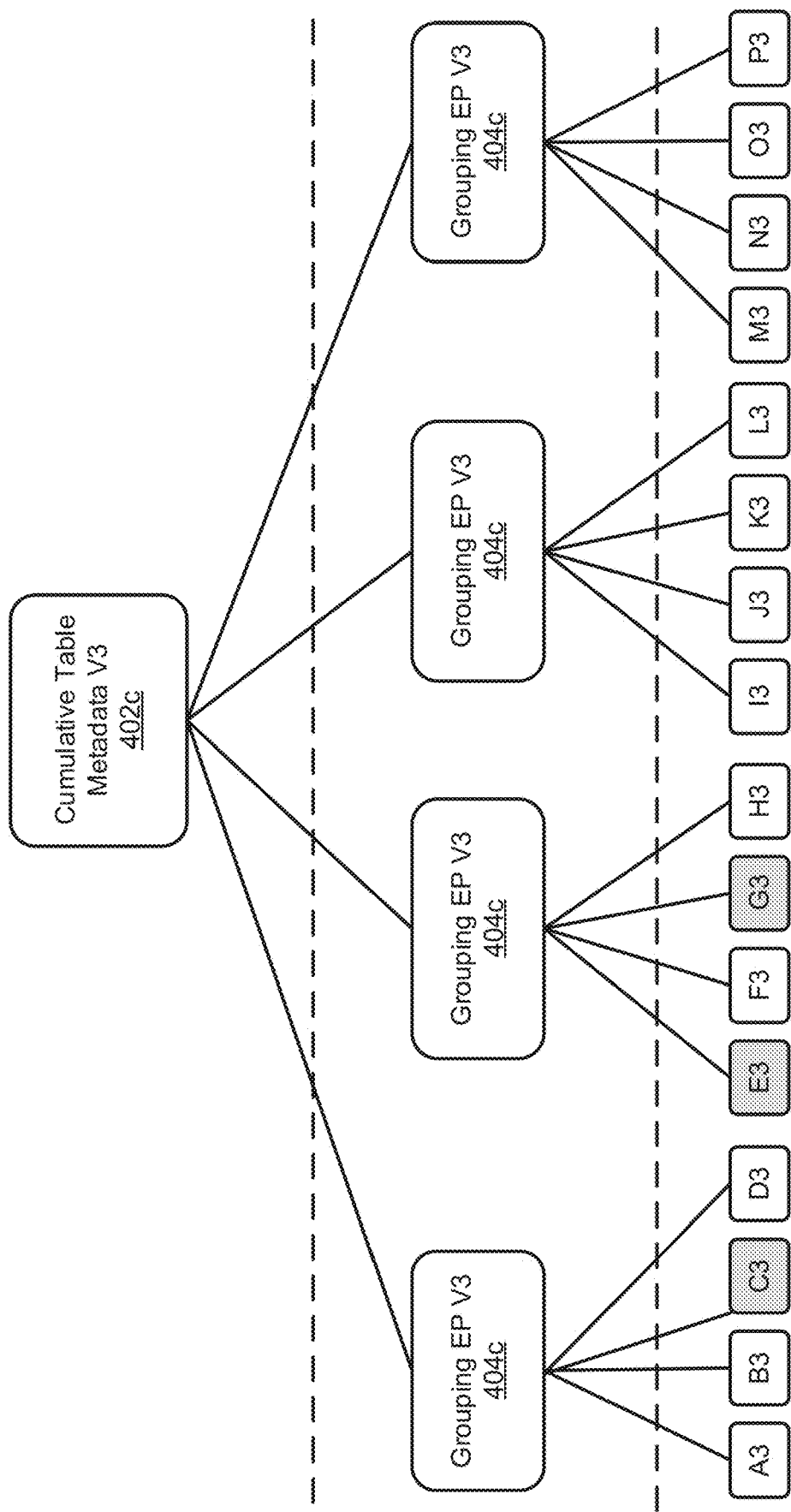

FIGS. 4A-4C illustrate the generation of cumulative table metadata 402 across multiple versions of a table of a database. The metadata structure depicted in FIGS. 4A-4C follows the data structure 300 disclosed in FIG. 3. Accordingly, there is cumulative table metadata 402 including global information about the table, along with grouping expression properties 404 for each grouping of table micro-partitions. Further, the table includes a plurality of micro-partitions each serving as an immutable storage device for storing database data that cannot be updated in-place.

FIG. 4A illustrates metadata for a first version (V1) of the table. The table has version one cumulative table metadata 402a and version one grouping expression properties 404a each including global information about a grouping of micro-partitions 406 of the table. Version 1 of the micro-partitions, including A1, B1, C1, D1, E1, F1, G1, and H1 are illustrated in FIG. 4A, The table includes a plurality of micro-partitions each storing a subset of the database data in the table.

FIG. 4B illustrates metadata for a second version (V2) of the table that includes a second version of the micro-partitions, including A2, B2, C2, D2, E2, F2, G2, H2, 12, J2, K2, and L2. The greyed micro-partitions (C2, E2, and G2) illustrate micro-partitions that were deleted by a transaction execution on the table. The new micro-partitions (12, J2, K2, and L2) illustrate micro-partitions that were added to the table by a transaction that was executed on the table. The non-greyed existing micro-partitions (A2, B2, D2, F2, and H2) illustrate micro-partitions that were not modified by any transaction executed on the table. As shown in FIG. 4B, a version two cumulative table metadata 402b is generated in response to a new version of the table being generated by one or more transactions being executed on the table. Further, new version two grouping expression properties 404b are generated in response to the new version of the table being generated by the one or more transactions executed on the table. In an embodiment, when micro-partitions are deleted from a grouping of micro-partitions, but no new micro-partitions were added to the grouping, the grouping expression properties 404b may not need to be recomputed. The minimum value, maximum value, number of nulls, and number of distinct values may now be overestimated, but may still be considered safe by the database client. The overestimated values may lead an optimizer to sub-optimal decisions but not to wrong query results. In this embodiment, the grouping expression properties 404b may still be recomputed for the sake of optimizer efficiency. In the example illustrated in FIG. 4B, after micro-partitions C2, E2, and G2 are deleted, the existing grouping expression properties 404b for the first and second grouping are still safe to use. These grouping expression properties 404b may not be recomputed or may be recomputed in a later phase. For each new version of the table, the grouping expression properties may be computed for groupings of newly added micro-partitions, and this may lead to efficient calculation of global grouping expression properties. Each of the micro-partitions 406 of the table constitutes an immutable storage device that cannot be updated in-place. Therefore, in response to a transaction being executed on the table, such as a DML command, a new micro-partition is generated to reflect the transaction and replace the prior micro-partition.

FIG. 4C illustrates metadata for a third version (V3) of the table. As illustrated, new micro-partitions have been added to the table in version three, including micro-partitions M3, N3, O3, and P3. An updated version three cumulative table metadata 402c provides global information about the table, and updated version three grouping expression properties 404c each provide global information about their associated groupings of version three micro-partitions.

Figure 5:
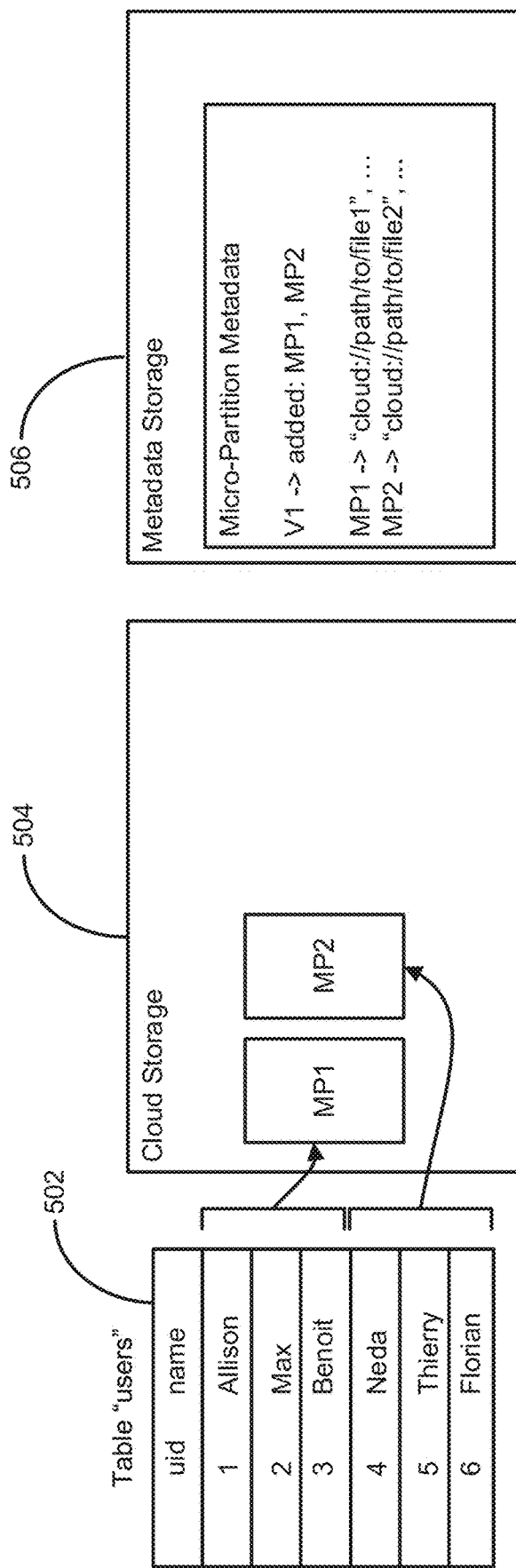
FIGS. 5-7 are block diagrams of an example operation of a database system when table data is stored in immutable storage and metadata is stored in mutable storage, according to an example embodiment of the systems and methods described herein.
Figure 6:
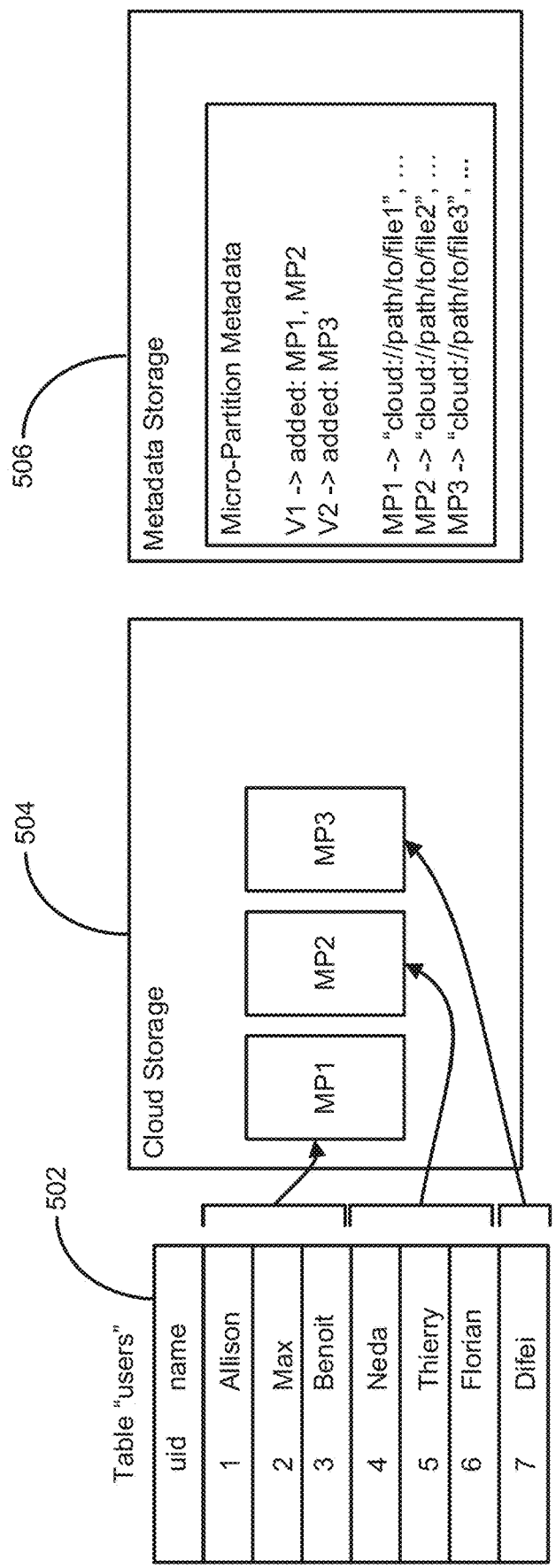
Figure 7:
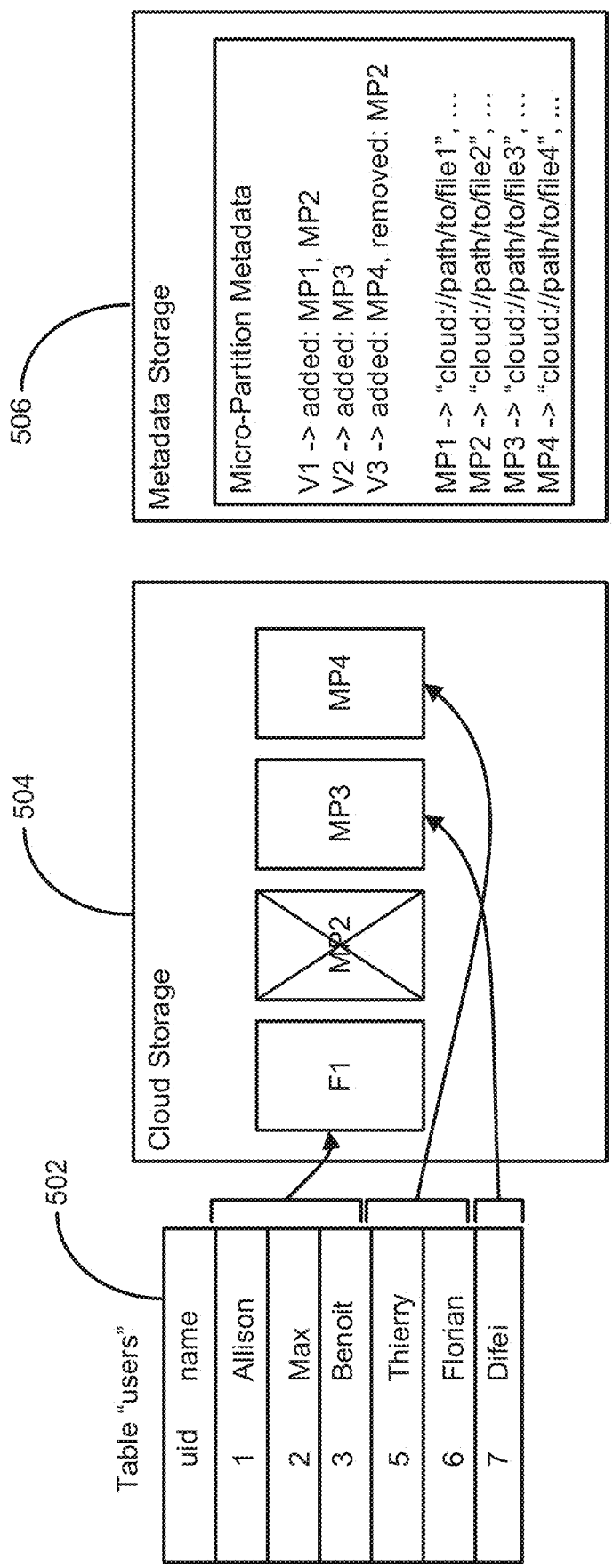
Figure 8:
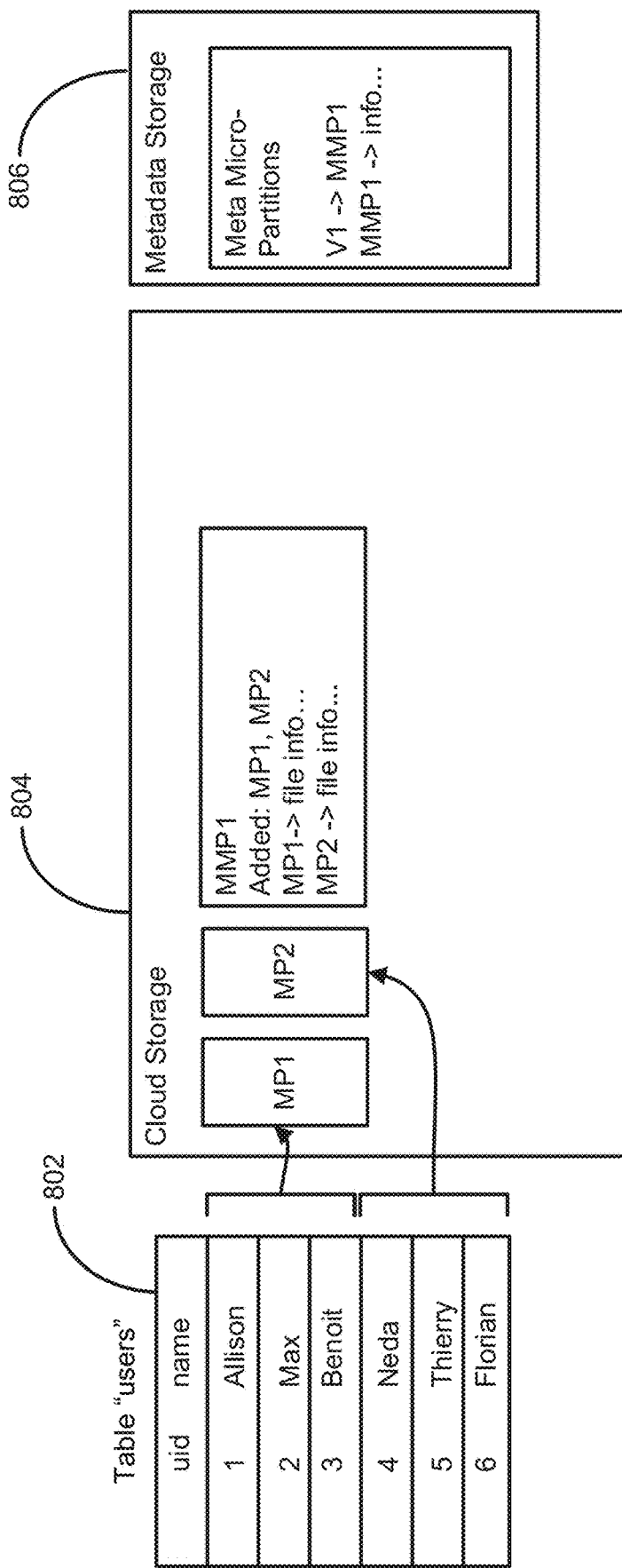
FIGS. 8-10 are block diagrams of an example operation of a database system when both table data and metadata are stored in immutable cloud storage, according to an example embodiment of the systems and methods described herein.
Figure 9:
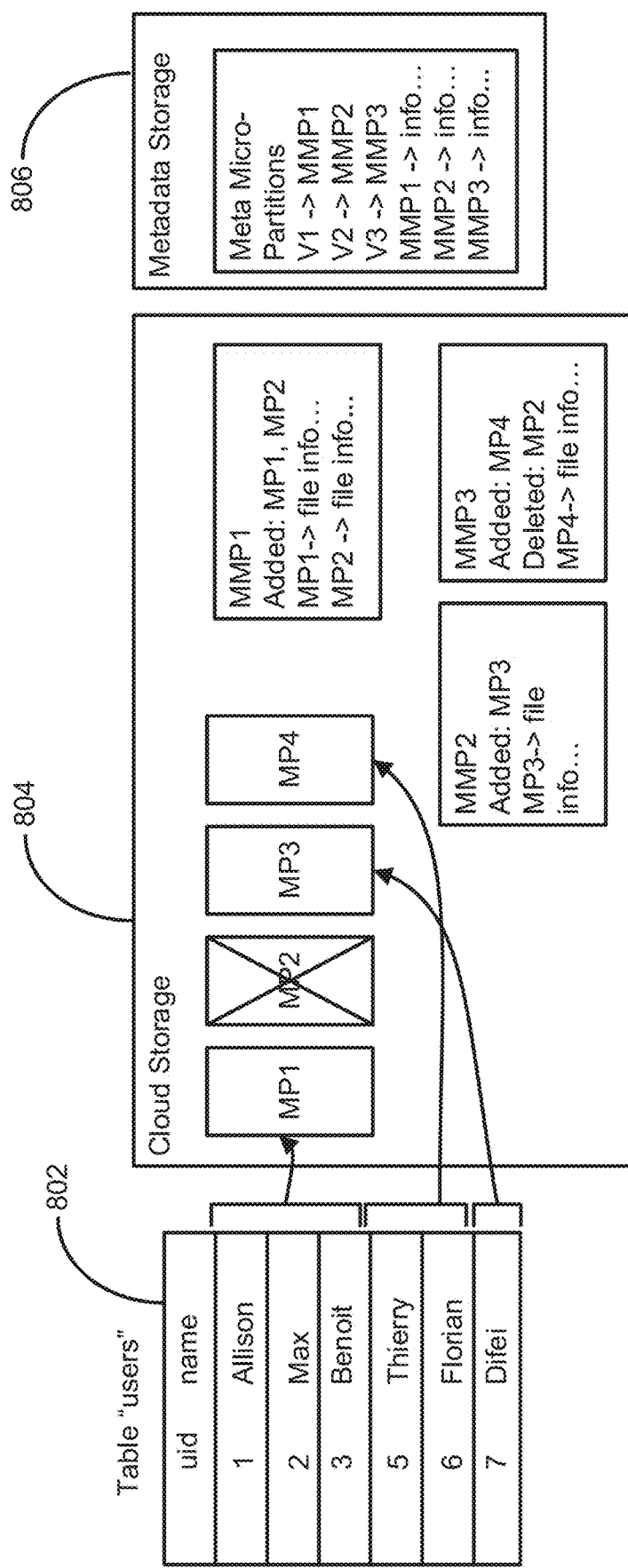
Figure 10:
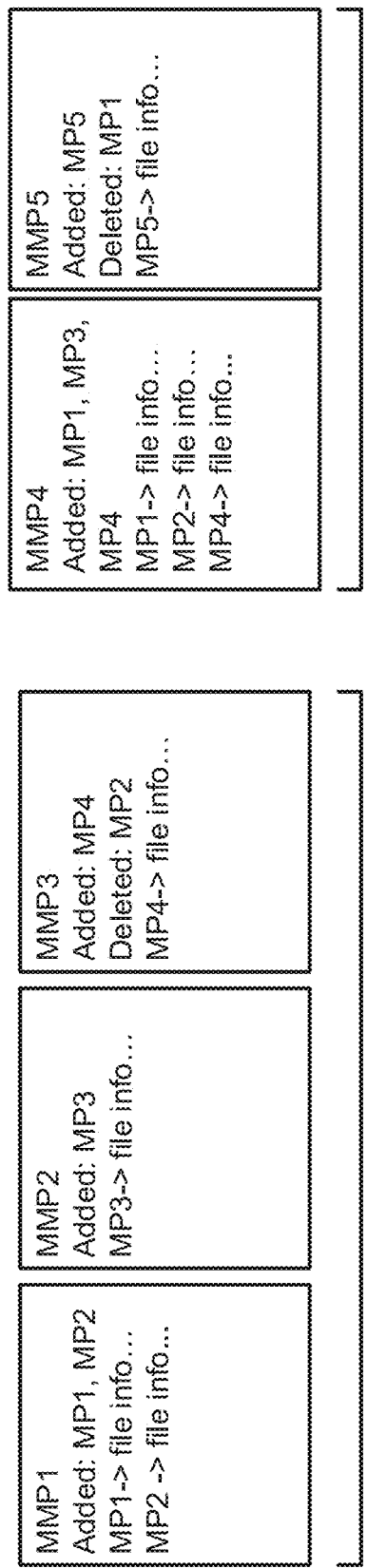

FIGS. 5-7 illustrate example operation of a database system when table data is stored in immutable storage (such as a cloud resource) and metadata is stored in mutable storage (such as a local key-value store). FIGS. 8-10 illustrate example operation of a database system when both table data and metadata is stored in immutable storage. In one example embodiment, data in database tables is stored in micro-partitions in the cloud. Metadata around tables and micro-partitions is stored in the metadata store. The metadata store may be a key-value store. Other example systems may use other technologies such as main memory storage or micro-partition system storage to store metadata.

FIG. 5 illustrates a table 502 having data stored in micro-partitions and associated metadata. The table 502 is a "users" table stored in two physical micro-partitions MP1 and MP2 in cloud storage 504. The micro-partitions MP1 and MP2 constitute micro-partitions of the table 502 that serve as immutable storage devices that cannot be updated in-place. The table 502 includes a "uid" column and a "name" column. The micro-partitions MP1 MP2 include the data (e.g., the field values) for the rows and columns of the table 502. Specifically, micro-partition NWT includes the table data for the first three rows (i.e., uids 1, 2, and 3 and names Allison, Max, and Benoit) while micro-partition MP2 includes the table data for the last three rows (uids 4, 5, and 6, and names Ikeda, Thierry, and Florian). In one embodiment, each micro-partition MP1 and MP2 stores data in a column-by-column format with the values for the "uid" column in a contiguous block and the values for the "name" column in a contiguous block within the respective micro-partition.

Micro-partition metadata is stored within metadata storage 506. The micro-partition metadata contains table versions and information about each table data micro-partition, this case MP1 and MP2. The metadata storage 506 may include mutable storage (storage that can be over written or written in-place), such as a local micro-partition system, system, memory, or the like. The metadata storage 506 may further include immutable storage that cannot be updated in-place.

In one embodiment, the micro-partition metadata consists of two data sets: table versions and micro-partition information. The table versions data set includes a mapping of table versions to lists of added micro-partitions and removed micro-partitions. Micro-partition information consists of information about each micro-partition, including micro-partition path, micro-partition size, micro-partition key id, and summaries of all rows and columns that are stored in the micro-partition, for example. In the state illustrated, table version VI indicates that micro-partitions MP1 and MP2 were added (V1->added: MP1, MP2). The micro-partition information shows information about MP1 (MP1->"cloud:// path/to/filet", fileSize: 16 MB, fileKevid: 3452, summaries of rows and columns, etc.) and MP2 (MP2->"/path/to/file2", fileSize: 11 MB, fileKeyId: 7965, summaries of rows and columns, etc.

Each modification of the table creates new micro-partitions and new micro-partition metadata. Inserts into the table create new micro-partitions. Deletes from the table remove micro-partitions and potentially add new micro-partitions with the remaining rows in a table if not all rows in a micro-partition were deleted. Updates remove micro-partitions and replace them with new micro-partitions with rows containing the updated records.

FIG. 6 illustrates the table and metadata of FIG. 5 after inserting a record in the "users" table 502. By way of example, when inserting the record (7, "Difei") into table "users," the data warehouse creates a new micro-partition MP3 in the cloud storage 504 that contains this record. Furthermore, the micro-partition metadata in the metadata storage 506 has been updated to include a new table version V2 and information about MP3. Table version V2 records that micro-partition MP3 was added. Micro-partition information includes the micro-partition path, account, created timestamp, micro-partition size, and summaries of all rows and columns that are stored micro-partition MP3.

FIG. 7 illustrates the table and metadata of FIG. 6 after deleting a record in the "users" table 502. For example, when deleting the record (4, "Neda") from table "users," the warehouse may create a new micro-partition MP4 that contains only two records (5, "Thierry") and (6, "Florian"). Micro-partition MP2 may be deleted from the cloud. Micro-partition MP4 may be the same as previous micro-partition MP2 except that row with uid "4" has been removed. The new micro-partition MP4 is stored in the cloud and the micro-partition metadata is updated with a new table version V3 and micro-partition information about micro-partition MP4. V3 indicates that micro-partition MP4 has been added and that micro-partition MP2 has been deleted.

When retrieving data from a table, the data warehouse may compute a scan set of all micro-partitions that need to be read. The scan set is an aggregation of all added micro-partitions except micro-partitions that were removed. The scan set may be computed using table versions. When selecting data from the table at the current time, the scan set is computed using all table versions up to the latest table version. When selecting data from the table at an earlier time, the scan set is computed using all table versions up to the table version that was current at the specified time. This technique of computing a scan set for any given time may be referenced herein as "time travel". For example, when a user selects data from table "users" in FIG. 7 after V3 has been implemented, a resource manager computes the scan set using table versions V1, V2, V3. The scan set is an aggregation of all added micro-partitions MP1, MP3, except deleted micro-partition MP2. Therefore, the scan set at the current time consists of micro-partitions MP1, MP3, MP4.

As another example, when selecting data at an earlier time when table version V2 was current, the scan set is computed using table versions V1 and V2. The scan set is aggregation of all added micro-partitions MP1, MP2, MP3. Since there were no removed micro-partitions, the scan set consists of micro-partitions MP1, MP2, MP3. In one embodiment, the scan set may be pruned using micro-partition information. For example, summaries of rows and columns of micro-partitions may be used to prune micro-partitions from the scan set because the contents of these micro-partitions will not be needed to compute a query result.

The above example method of storing micro-partition metadata in the metadata storage 506 has limitations. It consumes too much space and results in slow performance. In practice, micro-partition metadata of hundreds of millions of micro-partitions results in terabytes of micro-partition metadata. This results in slow performance when computing the scan set and pruning the scan set. Embodiments disclosed herein overcome one or more of these limitations, Storing and maintaining this (mutable) metadata on (non-mutable) cloud storage allows a database system to have virtually unlimited storage capacity and faster retrieval of metadata.

In one embodiment, metadata may be stored in metadata micro-partitions in immutable storage. In one embodiment, a system may write metadata micro-partitions to cloud storage for every modification of a database table. In one embodiment, a system may download and read metadata micro-partitions to compute the scan set. The metadata micro-partitions may be downloaded in parallel to improve scan set computation. In one embodiment, a system may periodically consolidate metadata micro-partitions in the background. In one embodiment, performance improvements, including pre-fetching, caching, columnar layout and the like may be included. Furthermore, security improvements, including encryption and integrity checking, are also possible with metadata micro-partitions with a columnar layout.

FIG. 8 illustrates the table 802 of FIG. 5 with metadata micro-partitions stored in cloud storage. The user's table 802 is shown with table data stored in table data micro-partitions MP1 and MP2 within cloud storage 804, similar to the structure shown in FIG. 5. However, metadata about the table data micro-partitions is stored in metadata micro-partition MMP1 in the cloud storage 804 as well. Metadata micro-partition MMP1 contains a list of added micro-partitions MP1 and MP2, including all micro-partition information about these micro-partitions. For example, the micro-partition information that was previously in the key-value store in the embodiment of FIG. 1 is in the metadata micro-partition (e.g., MMP1). At the point in time illustrated in FIG. 6, there are no deleted micro-partitions indicated in the metadata micro-partition MMP1. The metadata storage 806 only stores table version V1, which maps to metadata micro-partition MMP1, and information about metadata micro-partition MMP1. The information about metadata micro-partition MMP1 includes the micro-partition path of MMP1 and may include more information. Thus, both table data micro-partitions and metadata micro-partitions are stored in cloud storage, while information about metadata micro-partitions is stored in metadata storage 806 or other local and/or mutable storage.

FIG. 9 illustrates the table and metadata of FIG. 8 after adding a record (7, "Difei") and deleting a record (4, "Neda"). The first modification (insert uid "7" and name "Difei") stored micro-partition MP3 and metadata micro-partition MIMP2 in the cloud. MIMP2 lists added micro-partition MP3, including all micro-partition information about MP3. The metadata storage 806 is updated with table version V2, which maps to MMP2, and information about MMP2. The second modification (delete uid "4" and name "Neda") stored micro-partition MP4 and metadata micro-partition NEMP3 in the cloud storage 804. MMP3 lists added table data micro-partition MP4, including all micro-partition information of MP4, and also lists deleted table data micro-partitions of MP2.

The storage of the metadata micro-partitions MMP1, MMP2, and MMP3 in cloud storage 804 or immutable storage allows for increased metadata storage capacity. For example, all metadata about the table data micro-partitions MP1, MP2, MP3, and MP4 is found within the cloud storage 804 in the metadata micro-partitions MMP1, MMP2, and MMP3. Metadata about the metadata micro-partitions MMP1 (information about the metadata), which is much smaller in size, is stored in a key-value store, mutable storage, and/or local storage.

In one embodiment, a data warehouse computes a scan set of micro-partitions that must be read to answer a query. The scan set is computed using table versions. Given a set of table versions, the data warehouse reads information about the corresponding metadata micro-partitions from the metadata store. It then downloads the metadata micro-partitions from the cloud and reads the list of added and delete micro-partitions. Using these lists, it computes the scan set. Using micro-partition information stored in metadata micro-partitions (e.g, information about rows and columns), the scan set may be pruned such that only relevant portions of the scan set are scanned to respond to the query.

For example, when selecting data from table "users" 802 at the time illustrated in FIG. 9, the scan set is computed using table versions V1, V2, and V3. The warehouse reads information about corresponding metadata micro-partitions MMP1, MMP2, and MMP3. It downloads these metadata micro-partitions from the cloud. The micro-partitions may be downloaded in parallel. In one embodiment, a resource manager can begin reading one of the micro-partitions even if the others have not yet completely downloaded. From the aggregated list of added micro-partitions MP1, MP2, MP3, and MN it removes deleted micro-partition MP2. The resulting scan set would therefore be MP1, MP3, and MN. These micro-partitions (or sub-portions of them) may be retrieved by an execution node for executing the query.

In one embodiment, metadata micro-partitions are periodically consolidated in the background. Consolidation, or "compaction," of metadata micro-partitions aggregates all added micro-partitions of all metadata micro-partitions and removes all deleted micro-partitions from that list. Consolidation creates one or more compacted metadata micro-partitions that contain only the resulting added-micro-partitions list, including all micro-partition information of these micro-partitions. The purpose of consolidation is two-fold. First, many metadata micro-partitions are compacted into a much smaller set of metadata micro-partitions for faster downloading and reading. Second, micro-partitions that are not referenced anymore in the compacted metadata micro-partitions can be removed from the cloud once the old metadata micro-partitions are removed.

Metadata micro-partition versions distinguish different sets of metadata micro-partitions. The compacted micro-partitions in one metadata micro-partition version are a consolidation of all metadata micro-partitions of the previous metadata micro-partition version. New metadata micro-partitions are always registered under the latest metadata micro-partition version. Old metadata micro-partitions may be deleted from cloud storage after they have been consolidated. All micro-partitions that are not referenced in compacted micro-partitions may be deleted once they are not referenced in any metadata micro-partition anymore.

FIG. 10 is a block diagram illustrating consolidation of the metadata micro-partitions shown in FIG. 9. Specifically, metadata micro-partitions MMP1, MMP2, and MMP3 are shown consolidated into compacted metadata micro-partition MMP4. Metadata micro-partition MMP4 only contains added micro-partitions MP1, MP3, and MP4 because MP2 was deleted in MMP3. MMP4 also contains all micro-partition information of MP1, MP3, and MP4. In one embodiment, metadata micro-partition version three (MMP V3) is created and MMP4 is registered under MMP V3. A new metadata micro-partition MMP5 is registered under the latest metadata micro-partition version MMP V3. MMP5 corresponds to table version V4 (not shown in FIG. 9). Table version V3 may point to either MMP1, MMP2, and MMP3 of MMP V1 or to MMP4 of MMP V3, as they will result in the exact same scan set. As is illustrated, creation of the consolidated metadata micro-partition MMP4 allows for one micro-partition to do what previously took three micro-partitions. In one embodiment, an indication of a metadata micro-partition version may be stored after completing consolidation so that a version before the consolidation may still be determined or accessed. All subsequent table data changes may be reflected based on MMP4 or later. Thus, MMP1, MMP2, and MMP3 may be deleted, if desired or if they represent versions which no longer need to be maintained (e.g., for purposes of a "time travel" feature).

Constructing the scan set for a table version uses only metadata micro-partitions of a single metadata micro-partition version. The metadata micro-partition version to use is the largest metadata micro-partition version that is smaller or equal than the given table version. For example, constructing the scan set for table version V3 in FIG. 9 uses metadata micro-partition version V3 because it is the largest metadata micro-partition version that is smaller or equal to V3. Given the example in FIG. 9, Table 1 provides a list of metadata micro-partitions that must be read when constructing the scan set for a given table version:

TABLE 1

| Table Version | Metadata Micro-partition Version | Metadata Micro-partitions | Scan Set |
|---|---|---|---|
| V1 | MMP V1 | MMP1 | MP1, MP2 |
| V2 | MMP V1 | MMP1, MMP2 | MP1, MP2, MP3 |
| V3 | MMP V3 | MMP4 | MP1, MP3, MP4 |
| V4 | MMP V3 | MMP4, MMP5 | MP3, MP4, MP5 |

In one embodiment, consolidation of metadata micro-partitions happens in the background process in the data warehouse without any impact on the user workload. New metadata micro-partitions may be added while compacted micro-partitions are computed. Only when the compacted micro-partition has been uploaded to the cloud may it be used to compute that scan set.

Various performance improvements may be achieved with the immutable storage of metadata. In one embodiment, metadata micro-partitions are prefetched. For example, when downloading a set metadata micro-partitions, the data warehouse downloads the metadata micro-partitions in parallel in the background before the metadata micro-partitions are opened by the process. Pre-fetching improves reading time of metadata micro-partitions because when the process wants to open a metadata micro-partition it may have already been downloaded using pre-fetching.

In one embodiment, metadata micro-partitions are cached. Metadata micro-partitions may be cached on the local micro-partition system of a process. Metadata micro-partitions may only be downloaded once, even if they are read by many different processes that share the same micro-partition system. Old cached metadata micro-partitions may be deleted from the cache if the cache grows out of space. In this case, the metadata micro-partitions may be downloaded again as needed.

In one embodiment, metadata micro-partitions have a columnar layout. Micro-partition information within metadata micro-partitions is stored with a columnar layout. This means the format of the metadata micro-partition is not row-by-row, but column-by-column. If a process reads information about a column in a metadata micro-partition, it only needs to read a single, contiguous block of bytes. In one embodiment, every block of bytes is compressed using a standard compression algorithm ("gzip"). Both these techniques improved read performance.

Security improvements are also implemented in some embodiments. In one embodiment, metadata micro-partitions are encrypted using individual micro-partition keys. Within a metadata micro-partition, columns may be encrypted individually using AES-CTR mode with different start counters. This allows a database system to read an individual column from a metadata micro-partition because it can be decrypted without needing to decrypt the whole micro-partition at once. Encryption improves security because nobody can read the metadata micro-partition without having the proper micro-partition key.

For verification that metadata micro-partitions have not been altered, the system may store hashes of columns for each column within a metadata micro-partition. Before decrypting the data, the system compares the hash of the encrypted column with the stored hash of the column of this metadata micro-partition. If the hashes do not match, the metadata micro-partition must have been altered. This improves security because altering of metadata micro-partitions are detected by the database system.

Figure 15:
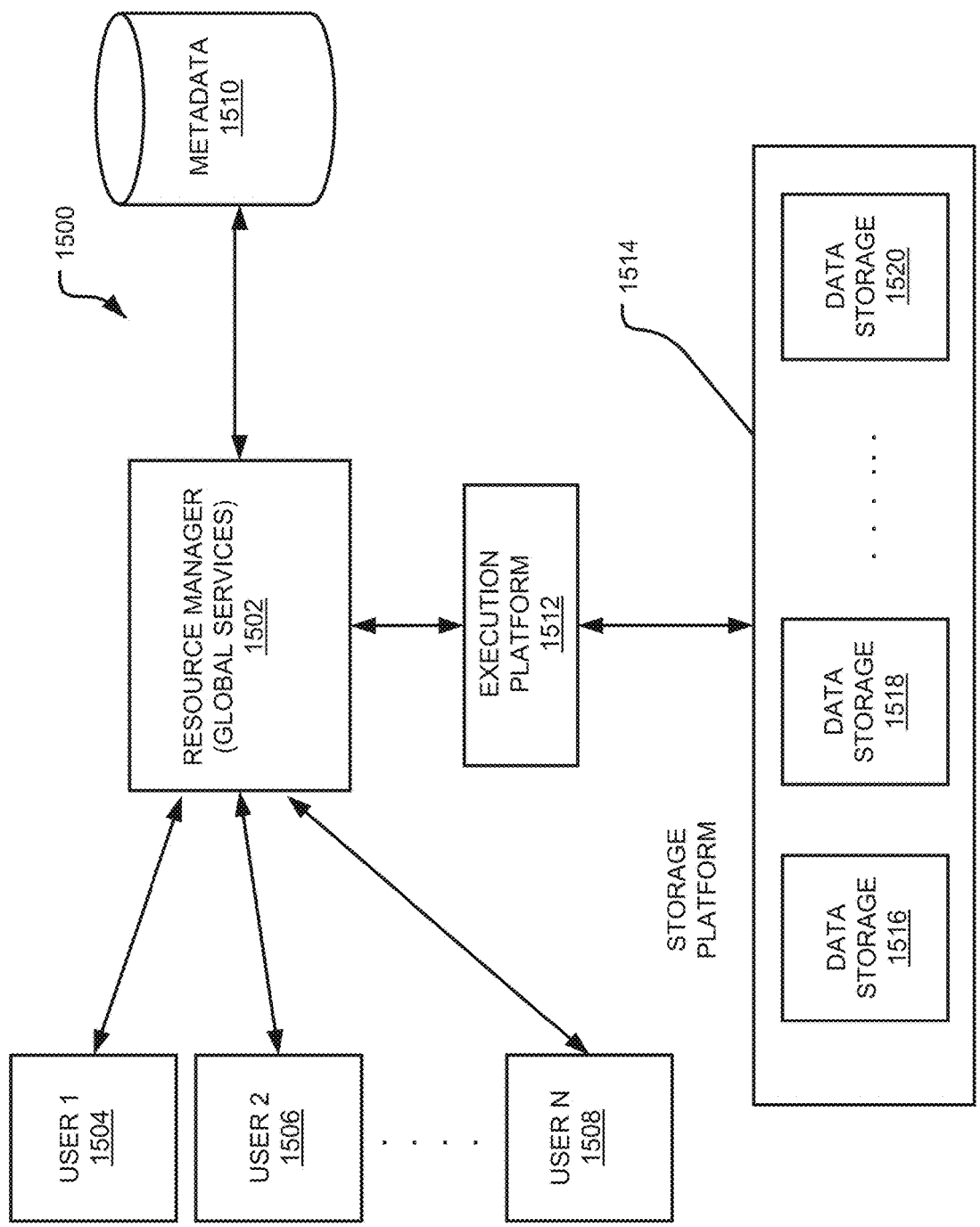
FIG. 15 is a schematic block diagram of a processing platform for providing database services, according to an example embodiment of the systems and methods described herein.

In some embodiments, the subject technology can store (e.g., in a network-based storage platform as discussed further in FIG. 15) cumulative table metadata (e.g., the cumulative table metadata 302), regional metadata corresponding to grouping expression properties (e.g., the grouping expression properties 314a-314d), micro-partition statistics (e.g., micro-partition statistics 304), and/or column expression properties (e.g., the column expression properties 308-312). As mentioned herein, expression properties may be referred to by "EP" or "EPs".

In an embodiment, during query execution, the aforementioned metadata corresponding to grouping expression properties described in FIGS. 4A-4C, during runtime (e.g., execution of a query), are computed and cached into memory (e.g., volatile storage), while the metadata corresponding to micro-partition statistics may be stored in persistent storage. However, this approach may increase latency and/or processor utilization in completing a query as such metadata is computed each time a query is executed in order to complete the query.

In the following discussion, the described embodiments instead pre-compute (e.g., prior to query execution) at least the metadata corresponding to grouping expression properties, which are stored (e.g., as a "two-level" data structure) in persistent storage provided by the subject system. In this fashion, such metadata corresponding to the grouping expression properties can be accessed from the persistent storage while foregoing repeated computations, during query execution, to access the metadata for completing the query.

In an example, when a consolidated metadata micro-partition MMP4 is created (illustrated in FIG. 10), a 2-level EP associated to MMP4 is pre-computed by grouping micro-partition statistics, column properties, and so forth, from all the added micro-partitions in MMP4 (i.e. MP1, MP3 and MP4).

Figure 11:
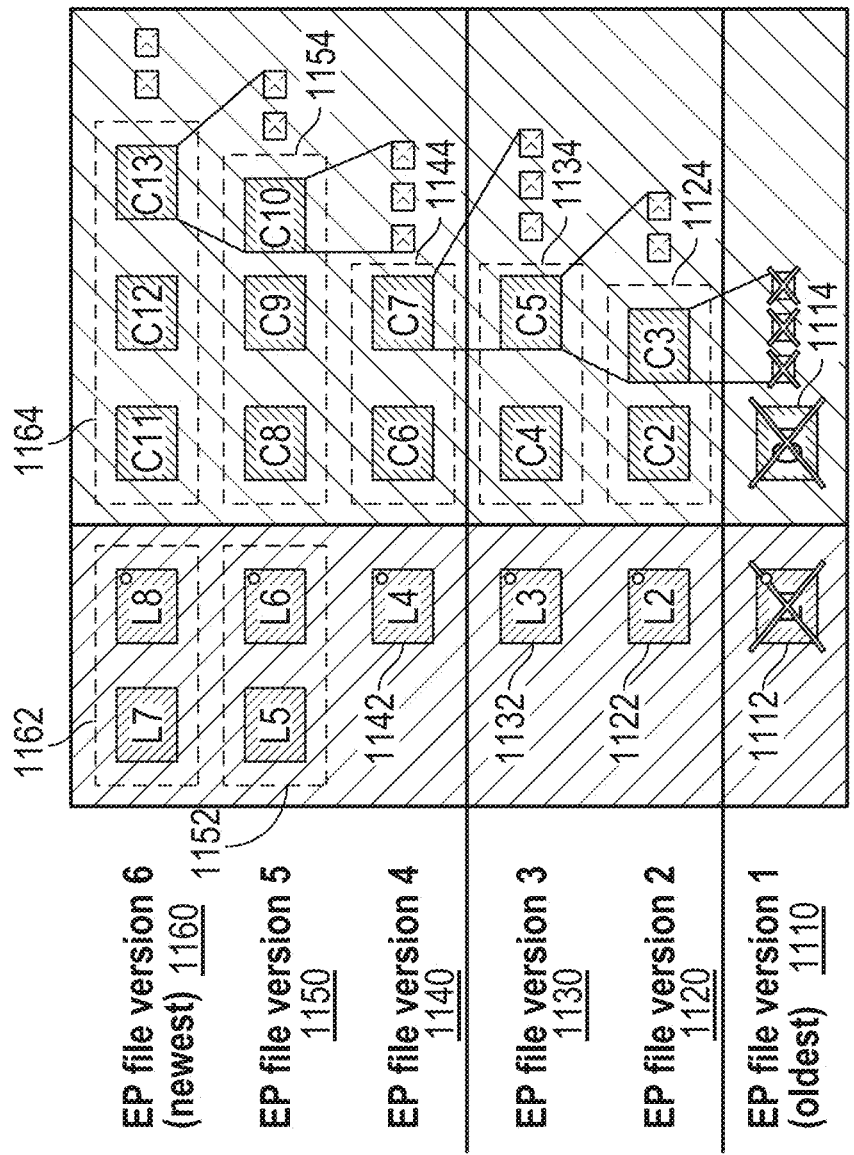
FIG. 11 illustrates examples of two-level data structures for storing metadata in accordance with some embodiments of the subject technology.

FIG. 11 illustrates examples of two-level data structures for storing metadata in accordance with some embodiments of the subject technology. Such a two-level data structure (also referred to as "2-level EP" or a "2-level EP file" herein) can at least store metadata corresponding to the aforementioned grouping expression properties and micro-partition statistics. More specifically, FIG. 11 is a schematic diagram of different versions of such a two-level data structure for storage of metadata in persistent storage (e.g., in the cloud) over various periods of time. In an embodiment, over time, data is received, processed, and/or stored in a given storage platform (described further in FIG. 15 below) and/or the file system 110 of the system 100. A different version of a two-level data structure can be generated, similar to the previous discussion in FIGS. 4A-4C of different versions of the aforementioned metadata, after a period of time (e.g., a fail safe period, a data retention period, and the like) and/or a particular amount of subsequent metadata has been received and/or generated by the subject system. In an embodiment, the example two-level data structures of FIG. 11 are tree data structures with a respective one-way pointer from a root node (e.g., a node corresponding to grouping expression properties) to each of a set of leaf nodes corresponding to one or more micro-partition statistics).

As illustrated, a first EP file version 1110 ("version 1") corresponds to an initial (e.g., "oldest") version of a2-level EP file 1112 that is generated by a resource manager (e.g., the resource manager 102) for storage in persistent storage. As further illustrated, different subsequent versions of 2-level EP files include a second EP file version 1120 including a 2-level EP file 1122, a third EP file version 1130 including a 2-level EP file 1132, a fourth EP file version 1140 including a 2-level EP file 1142, a fifth EP file versions 150 including 2-level EP files 1152, and a sixth EP file version 1160 including 2-level EP files 1162. In FIG. 11, each EP file version is generated by the background consolidation service (provided by the resource manager 102) e.g., each time when EP files get consolidated, a new EP file version is created.

Each of the aforementioned 2-level EP files contains both grouping expression properties and grouping micro-partition stats. In an example, each time a new EP file version gets created, a list of new compact EP files are created. For each newly created compact EP file, a grouping micro-partition stats (e.g., illustrated as EP file metadata in FIG. 12) and grouping EPs for columns are computed about all the added micro-partitions in that compact EP file, and saved in 2-level EP files. For example, L3 contains the grouping stats and EPs for C4 and C5.

In FIG. 11, the first EP file version 1110 is shown as being deleted (e.g., removed) from persistent storage, which can occur, in embodiment, as a new version of the 2-level EP file is generated by the subject system. As further shown, a compact EP file 1114 and delta EP files (e.g., smaller squares to the right of compact EP file 1114) are included in the first EP file version 1110.

In the second EP file version 1120, compact EP files 1124 are included, and delta. EP files (e.g., smaller squares) are to the right of compact EP files 1124. The compact EP files and/or the delta files are the files containing micro-partition statistics and column expression properties as described in FIG. 12. In the third EP file version 1130, compact EP files 1134 are included, and delta EP files (e.g., smaller squares) are to the right of compact EP files 1134. In an embodiment, the second EP file version 1120 and the third EP file version 1130 are kept in storage during a data retention period and a failsafe period. In an example, a data retention period specifies a period of time for which historical data is preserved and queryable, and a failsafe period corresponds to a period of time during which historical data is recoverable by the subject system, and can start immediately after data passes its retention period.

The fourth EP file version 1140 includes compact EP files 1144, and delta EP files (e.g., smaller squares) are to the right of compact EP files 1144.

The fifth EP file version 1150 includes compact EP files 1154, and delta EP files (e.g., smaller squares) are to the right of compact EP files 1154. The sixth EP file version 1160 includes compact EP files 1164, and delta EP files (e.g., smaller squares) are to the right of compact EP files 1164.

In an embodiment, the second EP file version 1120 and the third EP file version 1130 are kept in storage during a data retention period.

In an embodiment, different versions of an EP file can be generated during a consolidation or "compaction" process of metadata as described above.

In an example, processing of a compacted EP file for a 2-level-EP file occurs in the background (e.g., as part of a background service or process provided by the resource manager 102 as described before), which enables foreground usage to have a low latency thereby improving the functionality of a computer (e.g., the subject system or components thereof).

During compilation and optimization of a query on the database, a processor may scan cumulative table metadata (e.g., stored in a cache) to determine if a particular table includes information pertaining to the query. In response to determining, based on the cumulative table metadata, that the table includes information pertaining to the query, the processor may scan, from persistent storage, one of the grouping expression properties in FIG. 11 to determine which grouping of micro-partitions of the table include information pertaining to the query. In response to determining, based on a first cumulative expression property, that a first grouping of micro-partitions does not include information pertaining to the query, the processor however may discontinue database scanning of that first grouping of micro-partitions. In response to determining, based on a second cumulative expression property, that a second grouping of micro-partitions includes information pertaining to the query, the processor may proceed to scan expression properties, in persistent storage, for that second grouping of micro-partitions. The processor may efficiently determine which micro-partitions include pertinent data and which columns of which micro-partitions include pertinent data. The processor may proceed to scan only the relevant column(s) and micro-partition(s) from persistent storage that include information relevant to a database query. In this manner, a cost efficient technique for responding to a database query is provided by a 2-level EP file.

Figure 12:
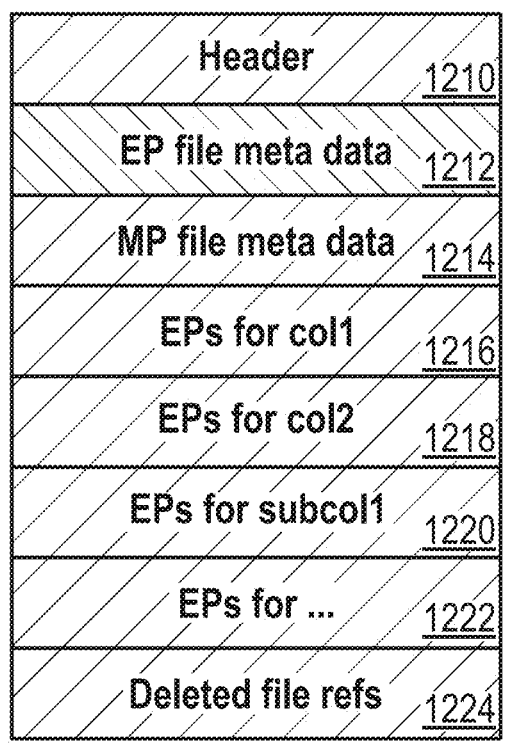
FIG. 12 illustrates example format for an expression properties ("EP") file (e.g., for two-level data structures), which can be utilized for storage of metadata in accordance with some embodiments of the subject technology.

FIG. 12 illustrates example format for an EP file 1200 (e.g., for two-level data structures), which can be utilized for storage of metadata in accordance with some embodiments of the subject technology.

In an embodiment, the EP file 1200 includes blocks of bytes. The EP file 1200 includes a header 1210, EP file metadata 1212 (e.g., a serialized list of EP metadata objects), micro-partition file metadata 1214 (e.g., a serialized list of metadata objects), expression properties 1216 for a first column (e.g., each block includes an array of metadata per micro-partition file), expression properties 1218 for a second column (e.g., each block includes an array of metadata per micro-partition file), expression properties for a first sub-column 1220 (e.g., each block includes an array of metadata per micro-partition file), and expression properties 1222 for other columns/sub-columns (e.g., each block includes an array of metadata per micro-partition file). Further, the EP file 1200 includes information for deleted global file references 1224 (e.g., for metadata corresponding to data manipulation language events and the like).

In an embodiment, EP file metadata 1212 includes data for metadata objects where each metadata object includes information to identify a given EP file e.g., account ID, table ID, EP file version, start file ID, and the like.

Figure 13:
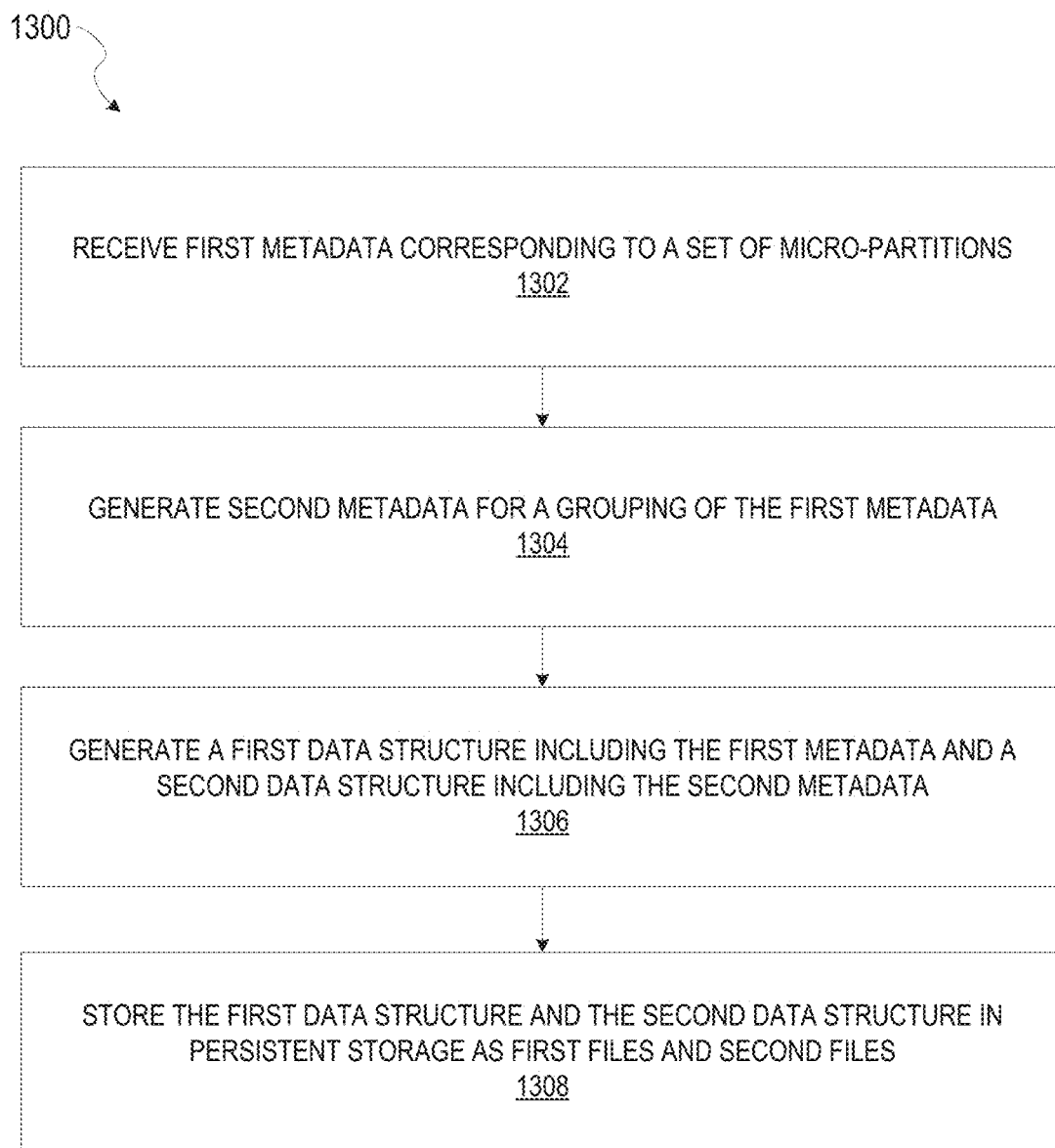
FIG. 13 is a flow diagram illustrating operations of a resource manager in performing a method for generating metadata to store in persistent storage, in accordance with some embodiments of the present disclosure.

FIG. 13 is a flow diagram illustrating operations of the resource manager 102 in performing a method 1300 for generating metadata to store in persistent storage, in accordance with some embodiments of the present disclosure. The method 1300 may be embodied in computer-readable instructions for execution by one or more hardware components (e.g., one or more processors) such that the operations of the method 1300 may be performed by components of the resource manager 102. Accordingly, the method 1300 is described below, by way of example with reference thereto. However, it shall be appreciated that the method 1300 may be deployed on various other hardware configurations and is not intended to be limited to deployment within the resource manager 102.

At operation 1302, the resource manager 102 receives first metadata corresponding to a set of micro-partitions. In an example, the first metadata may at least include a micro-partition expression property comprising information about data stored in a micro-partition of a table.

At operation 1304, the resource manager 102 generates second metadata for a grouping of the first metadata. In an example, the second metadata may at least include a grouping expression property that has information about data stored in the micro-partition and one or more additional micro-partitions of the table. In an embodiment, such a grouping expression property includes a summary of database data collectively stored across the micro-partition and one or more additional micro-partitions, a type of data collectively stored across the micro-partition and the one or more additional micro-partitions, a global minimum and maximum for the data collectively stored across the micro-partition and the one or more additional micro-partitions, a null count for the data collectively stored across the micro-partition and the one or more additional micro-partitions, and/or a distinct count for the data collectively stored across the micro-partition and the one or more additional micro-partitions.

At operation 1306, the resource manager 102 generates a first data structure including the first metadata and a second data structure including the second metadata. Such data structures can be implemented using a two-level EP file as described above. In an embodiment, two data structures are created and utilized, one for the first metadata and one for the second metadata. The first metadata and the second metadata are persisted as separate files in immutable storage. By having separate files for the first and second metadata the subject system is advantageously enabled to load the (much smaller) second metadata without having to load the first metadata.

At operation 1308 the resource manager 102 stores the first data structure and the second data structure in persistent storage as first files and second files, respectively. In an example, the first data structure and the second data structure are stored in a storage platform as discussed further in FIG. 15.

Figure 14:
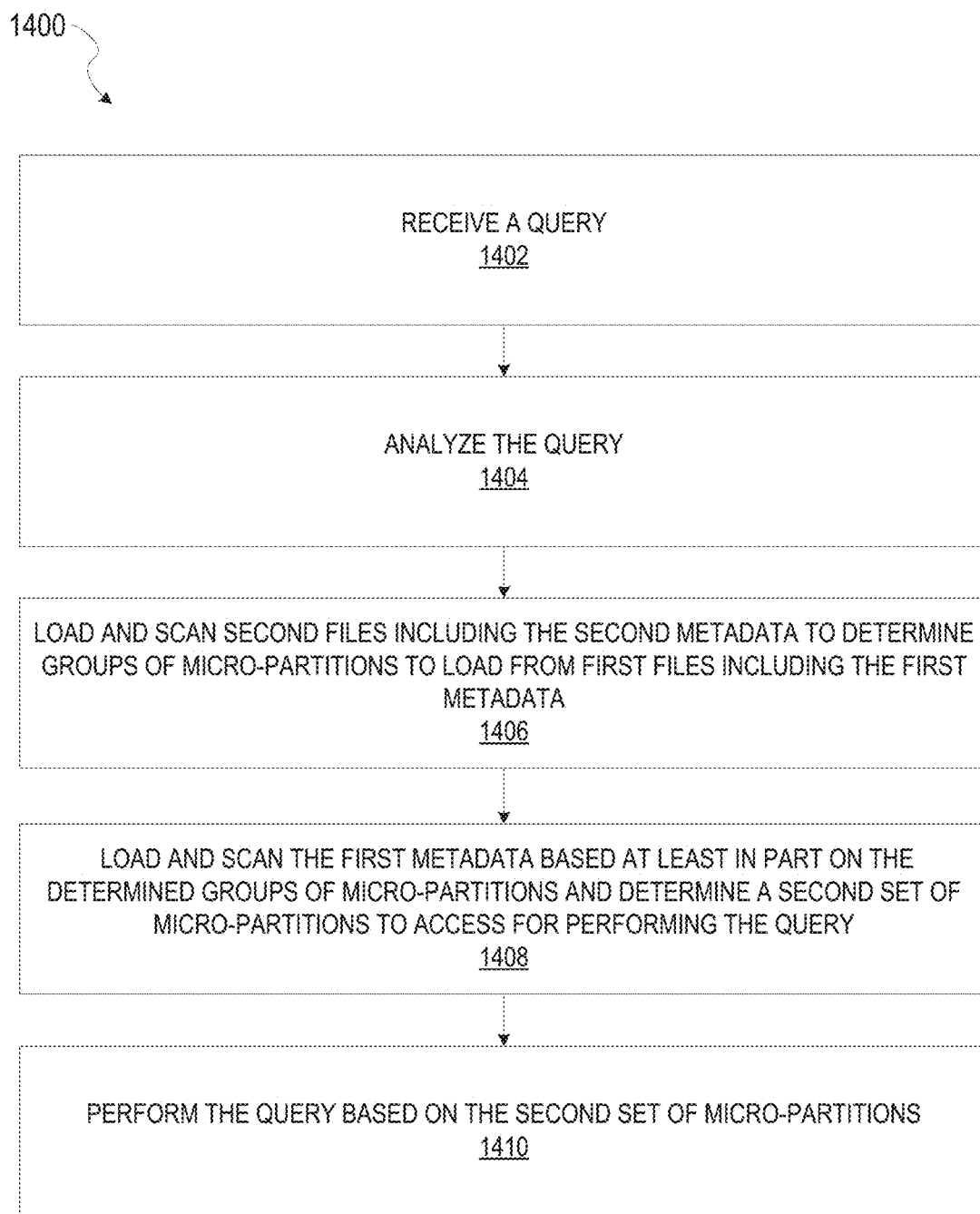
FIG. 14 is a flow diagram illustrating operations of the resource manager in performing a method for loading metadata from persistent storage in connection with executing a query, in accordance with some embodiments of the present disclosure.

FIG. 14 is a flow diagram illustrating operations of the resource manager 102 in performing a method 1400 for loading metadata from persistent storage in connection with executing a query, in accordance with some embodiments of the present disclosure. The method 1400 may be embodied in computer-readable instructions for execution by one or more hardware components (e.g., one or more processors) such that the operations of the method 1400 may be performed by components of the resource manager 102. Accordingly, the method 1400 is described below, by way of example with reference thereto. However, it shall be appreciated that the method 1400 may be deployed on various other hardware configurations and is not intended to be limited to deployment within the resource manager 102.

At operation 1402, the resource manager 102 receives a query on a table. In an example, the query may include a predicate.

At operation 1404, the resource manager 102 analyzes the query against cumulative table metadata to determine whether data stored in the table matches the query. In an example, the resource manager 102 evaluates the predicate against the cumulative table metadata to determine whether data stored in the table matches the predicate. The cumulative table metadata includes, in an example, global information about the micro-partitions of the table, where the cumulative table metadata is stored in a metadata micro-partition associated with the table.

In an embodiment, the cumulative table metadata is stored in a metadata micro-partition associated with the table, the metadata micro-partition including information comprising at least one of: a version number, a list of all added table data micro-partitions, a list of deleted table data micro-partitions, or information about each added table data micro-partition, the information including a micro-partition path, micro-partition size, micro-partition key identifier, and a summary of rows and columns that are stored in the table data micro-partition.

In an embodiment, the resource manager 102 caches the cumulative table metadata in a cache of at least one node of a resource manager, where the at least one node includes a processor and the cache.

In an embodiment, the resource manager 102 evaluates the query against a particular grouping expression property from the second metadata to determine whether a particular micro-partition comprises data matching the query.

In an embodiment, such a grouping expression property includes a summary of database data collectively stored across the particular micro-partition and one or more additional micro-partitions, a type of data collectively stored across the micro-partition and the one or more additional micro-partitions, a global minimum and maximum for the data collectively stored across the micro-partition and the one or more additional micro-partitions, a null count for the data collectively stored across the micro-partition and the one or more additional micro-partitions, and/or a distinct count for the data collectively stored across the micro-partition and the one or more additional micro-partitions.

At operation 1406, the resource manager 102, in response to determining that data stored in the table matches the query, loads and scans second files including the second metadata to determine groups of micro-partitions to load from first files including the first metadata. As discussed before in FIG. 13, the two files are generated and stored in persistent storage (e.g., in a storage platform) for loading during execution of a given query. In an embodiment, upon loading, the resource manager 102 can store the files into a cache similar to caching of the cumulative metadata as discussed before. In an embodiment, the first metadata and the second metadata are persisted in separate files, and the files are loaded separately when analyzing a query. Specifically, the second metadata (e.g., from the second file) is initially loaded to determine which groups of micro-partitions that are needed to load from the first metadata. Subsequently, the first metadata is loaded (e.g., from the first file) based on the determined groups of micro-partitions.

At operation 1408, the resource manager 102 loads and scans the first metadata based at least in part on the determined groups of micro-partitions (e.g., from operation 1406) and determines a second set of micro-partitions to access for performing the query.

At operation 1410, the resource manager 102 performs the query based on the second set of micro-partitions.

FIG. 15 illustrates a block diagram of a processing platform 1500 for providing database services, according to one embodiment. The processing platform 1500 includes a resource manager 1502 that is accessible by multiple users 1504, 1506, and 1508. The resource manager 1502 may also be referred to herein as a resource manager or global services. In some implementations, resource manager 1502 can support any number of users desiring access to data or services of the processing platform 1500. Users 1504-1508 may include, for example, end users providing data storage and retrieval queries and requests, system administrators managing the systems and methods described herein, software applications that interact with a database, and other components/devices that interact with resource manager 1502.

The resource manager 1502 may provide various services and functions that support the operation of the systems and components within the processing platform 1500. Resource manager 1502 has access to stored metadata 1510 associated with the data stored throughout data processing platform 1500. The metadata 1510 may be stored by a cloud provider, may be stored separate and independently of the storage platform 1514, and/or may be stored alongside database data stored in the storage platform 1514. The resource manager 1502 may use the metadata 1510 for optimizing user queries. In some embodiments, metadata 1510 includes a summary of data stored in remote data storage systems as well as data available from a local cache (e.g., a cache within one or more of the clusters of the execution platform 1512). Additionally, metadata 1510 may include information regarding how data is organized in the remote data storage systems and the local caches. Metadata 1510 allows systems and services to determine whether a piece of data needs to be processed without loading or accessing the actual data from a storage device.

As part of the data processing platform 1500, metadata 1510 may be collected when changes are made to the data using a data manipulation language (DML), which changes may be made by way of any MIL statement. Examples of manipulating data may include, but are not limited to, selecting, updating, changing, merging, and inserting data into tables. As part of the processing platform 1500, micro-partitions may be created, and the metadata may be collected on a per micro-partition and a per column basis. This collection of metadata may be performed during data ingestion or the collection of metadata may be performed as a separate process after the data is ingested or loaded. In an implementation, the metadata 1510 may include a number of distinct values; a number of null values; and a minimum value and a maximum value for each micro-partition. In an implementation, the metadata 1510 may further include string length information and ranges of characters in strings.

In one embodiment, at least a portion of the metadata 1510 is stored in immutable storage. For example, the metadata 1510 may be stored on the storage platform 1514 along with table data. In one embodiment, the same or separate cloud storage resources as that used for table data may be allocated and used for the metadata. In one embodiment, the metadata may be stored in local immutable storage. In one embodiment, information about the metadata 1510 in immutable storage, or information about metadata micro-partitions stored in immutable storage, is stored in mutable storage. The information about metadata may be referenced for locating and accessing the metadata stored in immutable storage. In one embodiment, systems with metadata storage may be restructured such that the metadata storage is used instead to store information about metadata micro-partitions located in immutable storage.

Resource manager 1502 is further in communication with an execution platform 1512, which provides computing resources that execute various data storage and data retrieval operations. The execution platform 1512 may include one or more compute clusters. The execution platform 1512 is in communication with one or more data storage devices 1516, 1518, and 1520 that are part of a storage platform 1514. The one or more data storage devices 1516, 1518, and 1520 may constitute a plurality of shared storage devices that collectively store the database data. Although three data storage devices 1516, 1518, and 1520 are shown in FIG. 4, the execution platform 1512 is capable of communicating with any number of data storage devices. In some embodiments, data storage devices 1516, 1518, and 1520 are cloud-based storage devices located in one or more geographic locations. For example, data storage devices 1516, 1518, and 1520 may be part of a public cloud infrastructure or a private cloud infrastructure, or any other manner of distributed storage system. Data storage devices 1516, 1518, and 1520 may include hard disk drives (HDDs), solid state drives (SSDs), storage clusters, or any other data storage technology. Additionally, the storage platform 1514 may include a distributed file system (such as Hadoop Distributed File Systems (HDFS)), object storage systems, and the like.

In some embodiments, the communication links between resource manager 1502 and users 1504-1508, mutable storage for information about metadata micro-partitions metadata micro-partition metadata), and execution platform 1512 are implemented via one or more data communication networks and may be assigned various tasks such that user requests can be optimized. Similarly, the communication links between execution platform 1512 and data storage devices 1516-1520 in storage platform 1514 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The resource manager 1502, metadata 1510, execution platform 1512, and storage platform 1514 are shown in FIG. 15 as individual components. However, each of resource manager 1502, metadata 1510, execution platform 1512, and storage platform 1514 may be implemented as a distributed system (e.g., distributed across multiple systems/platforms at multiple geographic locations) or may be combined into one or more systems. Additionally, each of the resource manager 1502, metadata 1510, the execution platform 1512, and the storage platform 1514 may be scaled up or down (independently of one another) depending on changes to the requests received from users 1504-1508 and the changing needs of the data processing platform 1500. Thus, in the described embodiments, the data processing platform 1500 is dynamic and supports regular changes to meet the current data processing needs.

Figure 16:
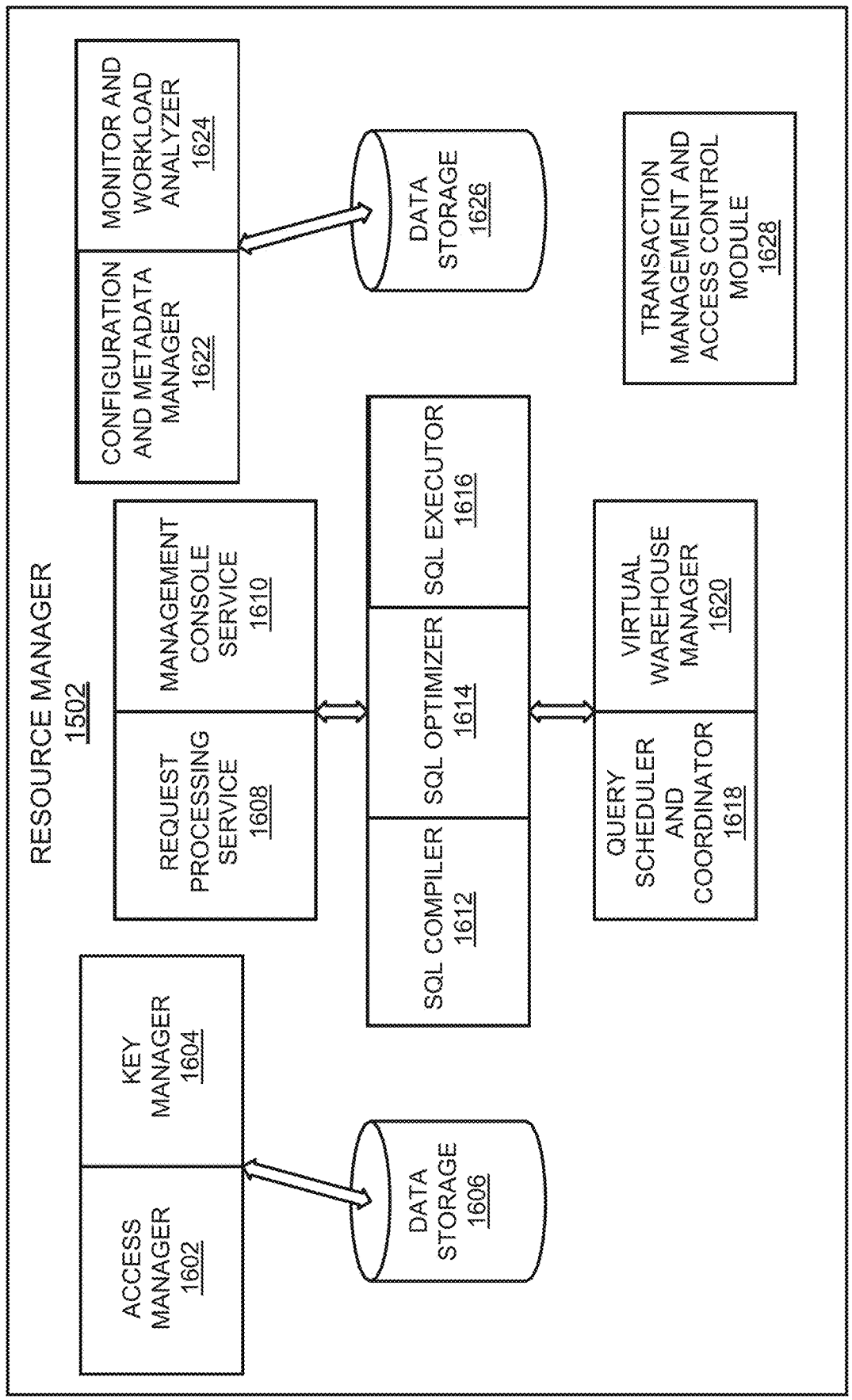
FIG. 16 is a schematic block diagram depicting components of a resource manager, according to an example embodiment of the systems and methods described herein.

FIG. 16 illustrates a block diagram depicting components of resource manager 1502, according to one embodiment. The resource manager 1502 includes an access manager 1602 and a key manager 1604 coupled to a data storage device 1606. The access manager 1602 handles authentication and authorization tasks for the systems described herein. The key manager 1604 manages storage and authentication of keys used during authentication and authorization tasks. A request processing service 1608 manages received data storage requests and data retrieval requests. A management console service 1610 supports access to various systems and processes by administrators and other system managers.

The resource manager 1502 also includes an SQL compiler 1612, an SQL optimizer 1614 and an SQL executor 1616. SQL compiler 1612 parses SQL queries and generates the execution code for the queries. SQL optimizer 1614 determines the best method to execute queries based on the data that needs to be processed. SQL executor 1616 executes the query code for queries received by resource manager 1502. A query scheduler and coordinator 1618 sends received queries to the appropriate services or systems for compilation, optimization, and dispatch to an execution platform 1512. A virtual warehouse manager 1620 manages the operation of multiple virtual warehouses.

Additionally, the resource manager 1502 includes a configuration and metadata manager 1622, which manages the information related to the data stored in the remote data storage devices and in the local caches. A monitor and workload analyzer 1624 oversees the processes performed by the resource manager 1502 and manages the distribution of tasks (e.g., workload) across the virtual warehouses and execution nodes in the execution platform 1512. Configuration and metadata manager 1622 and monitor and workload analyzer 1624 are coupled to a data storage device 1626. In one embodiment, the configuration and metadata manager 1622 collects, stores, and manages metadata in an immutable storage resource. In one embodiment, updates to metadata result in new micro-partitions and are not updated in place.

Metadata micro-partitions, as discussed herein, may include micro-partitions that contain metadata of modifications (e, g., each modification) to any database table in a data warehouse. A modification of a database table may generate one or more metadata micro-partitions, often just a single metadata micro-partition. In one embodiment, metadata micro-partitions contain the following information: information about a metadata micro-partition, including a version number; a list of all added table data micro-partitions; a list of deleted table data micro-partitions; and information about each added table data micro-partition, including micro-partition path, micro-partition size, micro-partition key id, as well as summaries of all rows and columns that are stored in the table data micro-partition.

In one embodiment, the contents of metadata micro-partitions may vary over time. If format or content of a metadata micro-partition changes, the version number of the metadata micro-partition may be incremented. In one embodiment, the metadata store (or other mutable data storage resource) only stores information about metadata micro-partitions (which are stored in immutable storage), not about table data micro-partitions. In practice, information about metadata micro-partitions stored in in the metadata store (or other mutable storage) is very limited and may contain data for thousands of metadata micro-partitions. In one embodiment, information for up to 30,000 metadata micro-partitions may be stored within a metadata micro-partition. This dramatically reduces the amount of storage needed in the metadata store or other mutable storage.

In one embodiment, a system writes metadata micro-partitions to cloud storage for every modification of a database table (e.g., modification of table data micro-partitions). In addition to adding and deleting micro-partitions, every modification to a database table in the data warehouse also generates one or more metadata micro-partitions. Typically, a modification creates a single metadata micro-partition. However, if the modification to the table is large (e.g., an insert into a table that produces very many micro-partitions), it may result in the creation of multiple metadata micro-partitions.

The resource manager 1502 also includes a transaction management and access control module 1628, which manages the various tasks and other activities associated with the processing of data storage requests and data access requests. For example, the transaction management and access control module 1628 provides consistent and synchronized access to data by multiple users or systems. Since multiple users/systems may access the same data simultaneously, changes to the data may be synchronized to ensure that each user/system is working with the current version of the data. Transaction management and access control module 162.8 provides control of various data processing activities at a single, centralized location in resource manager 1502.

Figure 17:
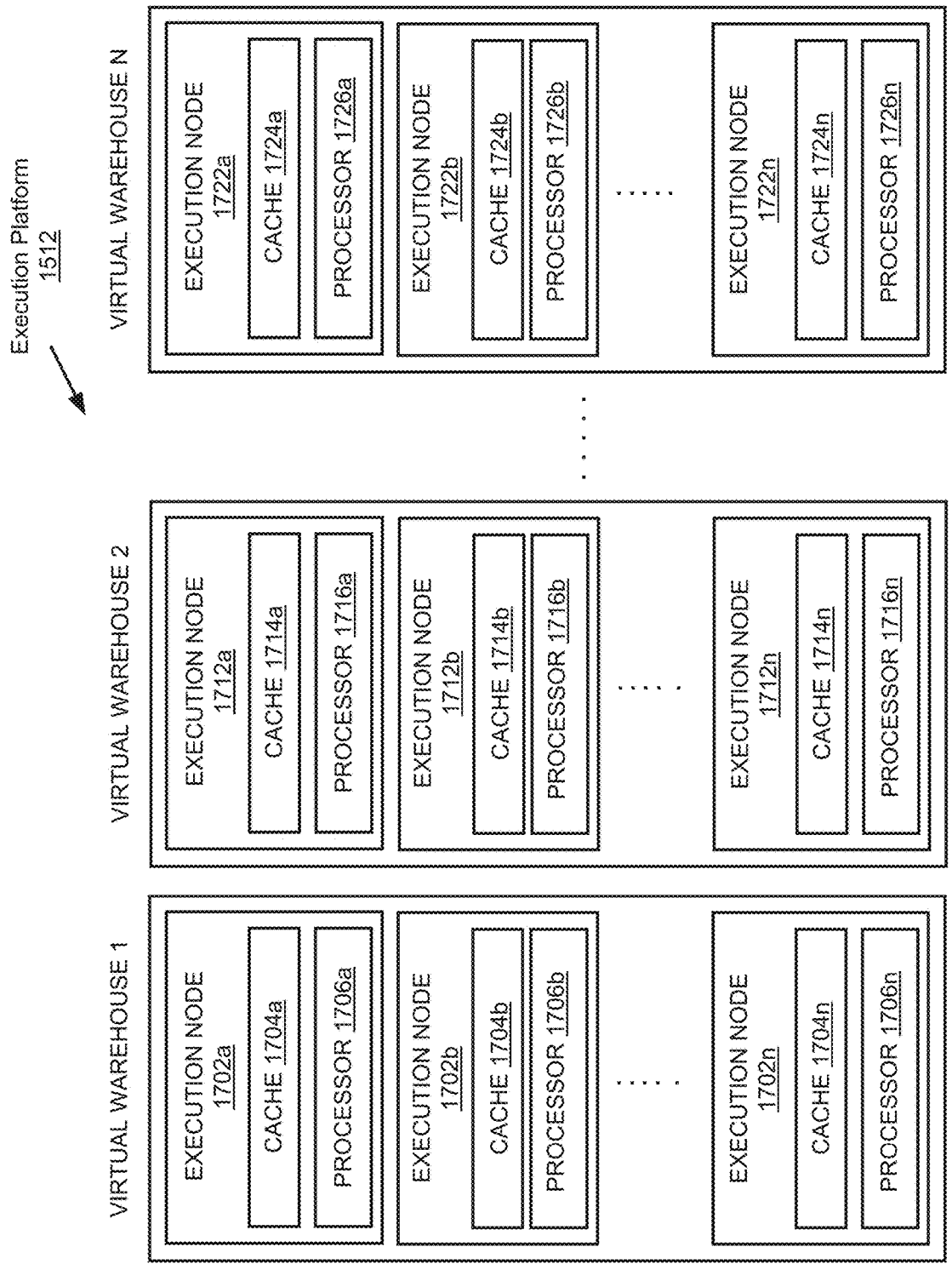
FIG. 17 is a schematic block diagram of an execution platform, according to an example embodiment of the systems and methods described herein.

FIG. 17 is a block diagram depicting an embodiment of an execution platform 1512. As shown in FIG. 17, execution platform 1512 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, execution platform 1512 can add new virtual warehouses and drop existing virtual warehouses in real-time based on the current processing needs of the systems and users. This flexibility allows the execution platform 1512 to quickly deploy large amounts of computing resources when needed without being forced to continue paying for those computing resources when they are no longer needed. All virtual warehouses can access data from any data storage device (e.g., any storage device in shared database storage such as the storage platform 1514). Although each virtual warehouse shown in FIG. 17 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 1516-1520 shown in FIG. 15. Thus, the virtual warehouses are not necessarily assigned to a specific data storage device and, instead, can access data from any of the data storage devices 1516-1520 within the storage platform 1514. Similarly, each of the execution nodes shown in FIG. 17 can access data from any of the data storage devices 1516-1520. In some embodiments, a particular virtual warehouse or a particular execution node may be temporarily assigned to a specific data storage device, but the virtual warehouse or execution node may later access data from any other data storage device.

In the example of FIG. 17, virtual warehouse 1 includes three execution nodes 1702a, 1702b, and 1702n. Execution node 1702a includes a cache 1704a and a processor 1706a. Execution node 1702b includes a cache 1704b and a processor 1706b. Execution node 1702n includes a cache 1704n and a processor 1706n. Each execution node 1702a, 1702b, and 1702n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 1712a, 1712b, and 1712n. Execution node 1712a includes a cache 1714a and a processor 1716a. Execution node 1712b includes a cache 1714b and a processor 1716b. Execution node 1712n includes a cache 1714n and a processor 1716n. Additionally, virtual warehouse 3 includes three execution nodes 1722a, 1722b, and 1722n. Execution node 1722a includes a cache 1724a and a processor 1726a, Execution node 1722b includes a cache 1724b and a processor 1726b. Execution node 1722n includes a cache 1724n and a processor 1726n.

In some embodiments, the execution nodes shown in FIG. 17 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 17 each include one data cache and one processor, alternate embodiments may include execution nodes containing any number of processors and any number of caches. Additionally, the caches may vary in size among the different execution nodes. The caches shown in FIG. 17 store, in the local execution node, data that was retrieved from one or more data storage devices in shared database storage. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the shared database storage of the storage platform 1514.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 1512, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 17 as having multiple execution nodes. The multiple execution nodes associated with each virtual warehouse may be implemented using multiple computing systems at multiple geographic locations. For example, an instance of virtual warehouse 1 implements execution nodes 1702a and 1702b on one computing platform at a geographic location and implements execution node 1702n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 1512 is also fault tolerant. For example, if one virtual warehouse fails, that virtual warehouse is quickly replaced with a different virtual warehouse at a different geographic location.

A particular execution platform 1512 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the shared database storage of the storage platform 1514 but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 18:
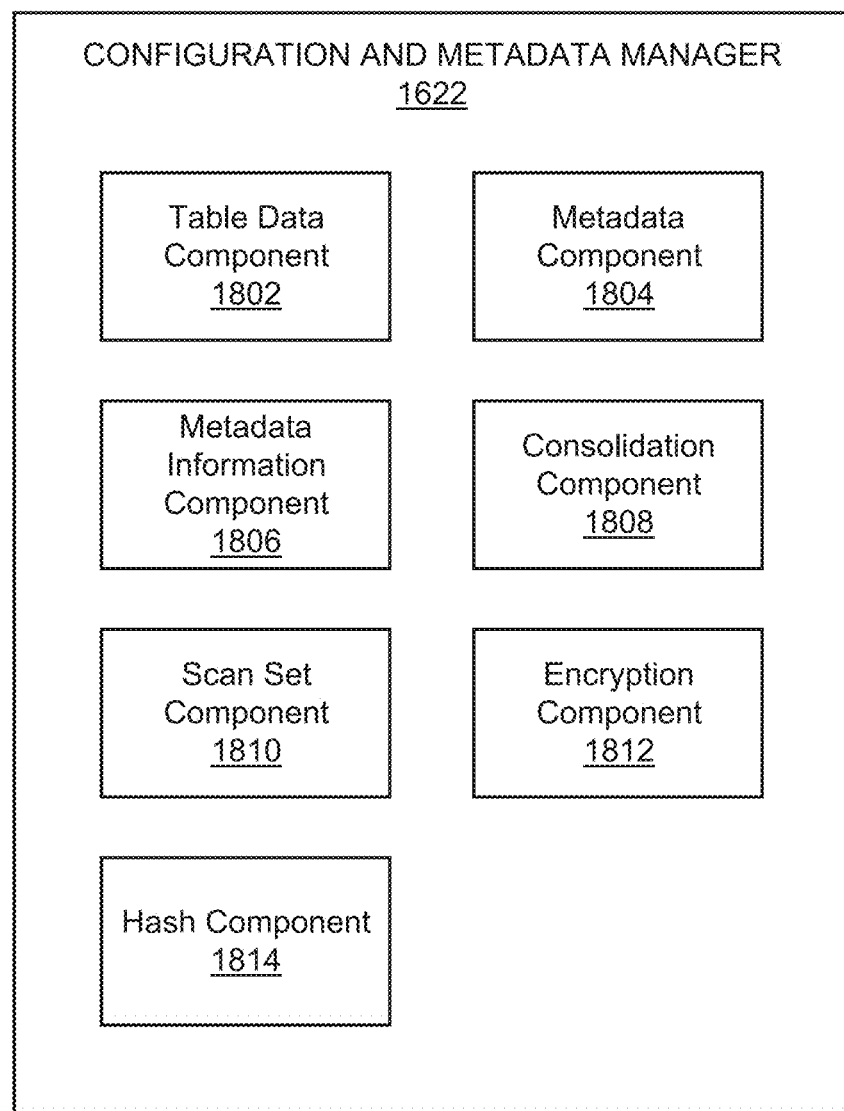
FIG. 18 is a schematic block diagram depicting components of a configuration and metadata manager, according to an example embodiment of the systems and methods described herein.

FIG. 18 is a schematic block diagram illustrating components of a configuration and metadata manager 1622, according to one embodiment. The configuration and metadata manager 1622 may collect, store, and manage metadata about table data micro-partitions as well as metadata about metadata micro-partitions. Such metadata may include cumulative table metadata, grouping expression properties, micro-partition expression properties (may also be referred to as file statistics), column expression properties, and so forth as disclosed herein. The configuration and metadata manager 1622 includes a table data component 1802, a metadata component 1804, a metadata information component 1806, a consolidation component 1808, a scan set component 1810, an encryption component 1812, and a hash component 1814. The components 1802-1814 are given by way of illustration only and may not all be included in all embodiments. In fact, some embodiments may include only one or any combination of two or more of the components 1802-1814. For example, some of the components may be located outside or separate from the configuration and metadata manager 1622, such as within a resource manager 1502 or processing platform 1500. Furthermore, the components 1802-1814 may comprise hardware, computer readable instructions, or a combination of both to perform the functionality and provide the structures discussed herein.

The table data component 1802 stores table data for a database, the table data includes information in rows and columns of one or more database tables. The table data component 1802 may store table data in table data micro-partitions within a storage resource. Example storage resources include cloud storage and/or immutable storage. In one embodiment, the storage resources for storage of table data micro-partitions may be dynamically allocated to accommodate increases or decreases in storage requirement. The table data component 1802 may manage and store table data by causing the data to be stored or updated in a remote resource, such as a cloud storage resource or service.

The metadata component 1804 stores metadata on immutable storage. The metadata may include information about or describing the table data for the database stored by the table data component 1802. In one embodiment, the metadata micro-partitions may include metadata such as an indication of added or deleted table data micro-partitions. The metadata may include micro-partition information for table data micro-partitions, the micro-partition information including one or more of a micro-partition name and a storage location. In one embodiment, the metadata may be stored in micro-partitions on the same cloud storage resources as the table data. In one embodiment, metadata component 1804 may cause the metadata to be stored within metadata micro-partitions in a column-by-column format in remote cloud storage.

The metadata component 1804 may also collect and manage storage of metadata within metadata micro-partitions on the immutable storage. The metadata component 1804 may create, in response to a change in the table data, a new metadata micro-partition in the immutable storage without modifying previous metadata micro-partitions. The new metadata micro-partition may include metadata indicating the change in the table data. In one embodiment, the metadata in the new metadata micro-partition indicates an addition or a deletion of a table data micro-partition comprising the table data. The metadata component 1804 may also delete expired metadata micro-partitions. Expired metadata micro-partitions may include those older than a specific age and that are not referenced in metadata information stored by the metadata information component 1806.

The metadata information component 1806 stores and manages information about the metadata in mutable storage. The information about the metadata (metadata about metadata micro-partitions) may be stored in local mutable storage and/or in metadata storage (or what was previously referenced as metadata storage. In one embodiment, however, the information about the metadata only includes information about metadata micro-partitions, not metadata about table data micro-partitions. Thus, all table data metadata may be located in immutable storage. In one embodiment, the information about metadata may be stored and updated in place. For example, the information about the metadata, in one embodiment, is stored in a key-value store. The information about the metadata includes information indicating a version and indicating one or more metadata micro-partitions that included metadata corresponding to the version.

The consolidation component 1808 consolidates or compacts metadata from two or more old metadata micro-partitions into a consolidated metadata micro-partition. In one embodiment, the consolidated metadata micro-partition includes metadata reflecting the table data changes indicated in the two or more old metadata micro-partitions. In one embodiment, the consolidation component 1808 deletes the two or more old metadata micro-partitions. The consolidation component 1808 may delete one or more table data micro-partitions not referenced by metadata in the consolidated metadata micro-partition.

The scan set component 1810 is may compute a scan set for a query. In one embodiment, a database system may receive a query directed to a database that includes the table data. The scan set component may retrieve a plurality of uncached metadata micro-partitions or cause another component to do so. The metadata micro-partitions may include metadata micro-partitions that correspond to the query. In one embodiment, the scan set component downloads the metadata micro-partitions in parallel from the immutable storage. In one embodiment, the scan set component determines the scan set by reading a first metadata micro-partition before a second metadata micro-partition has been fully downloaded. This may allow for improved speed in computing scan sets because the processing and downloading of metadata can be done micro-partition by micro-partition or in chunks. Thus, a database system does not need to wait for all micro-partitions to download before it starts computing the scan set, it can compute the scan set as the metadata micro-partitions are retrieved (either from cache or from immutable storage). In one embodiment, the scan set indicates one or more table data micro-partitions needed to perform the query.

The encryption component 1812 is configured to encrypt table data and metadata. In one embodiment, the encryption component 1812 encrypts the metadata column-by-column to allow for independent decryption and reading of metadata for a specific column.

The hash component 1814 computes and stores hashes for columns. For example, upon creating a metadata micro-partition, the hash component 1814 may compute a hash for each column in the metadata micro-partition and store the hash. Later, when a column in the micro-partition is accessed, the hash component 1814 may compute the hash and compare it to the stored hash. If the hashes are different, the hash component 1814 may determine that the metadata in that column has been altered.

Figure 19:
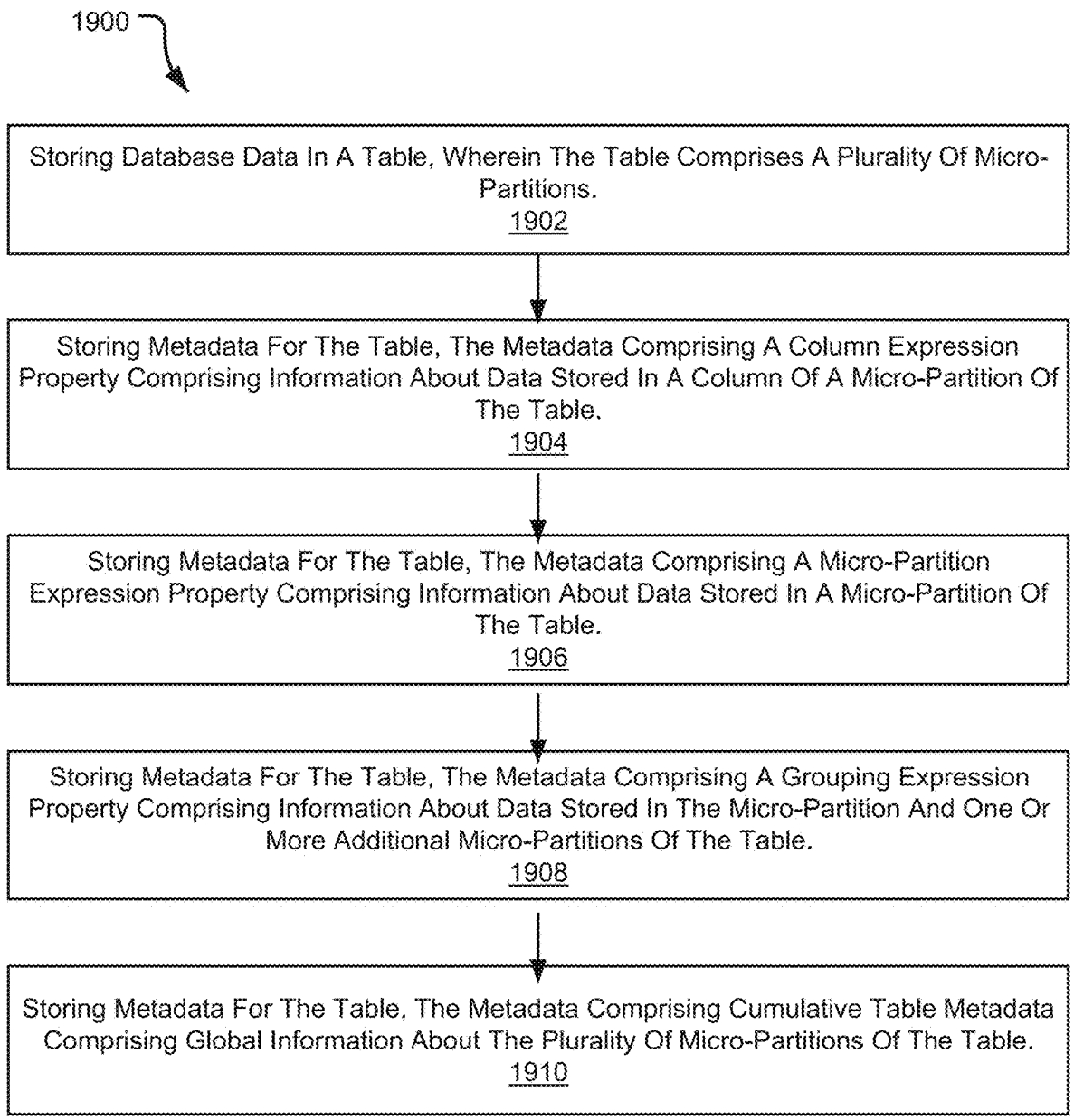
FIG. 19 is a schematic flow chart diagram of a method for managing metadata in a database system, according to an example embodiment of the systems and methods described herein.

FIG. 19 is a schematic flow chart diagram illustrating an example method 1900 for managing metadata in a database system. The method 1900 may be performed by any suitable computing resource such as a configuration and metadata manager 1622, resource manager 1502, processing platform 1500, and/or other service or platform.

The method 1900 begins and a computing resource stores or manages at 1902 database data in a table, wherein the table includes a plurality of micro-partitions. The method 1900 continues and the computing resource stores or manages at 1904 metadata for the table, the metadata including a column expression property comprising information about data stored in a column of a micro-partition of the table. The computing resource stores or manages at 1906 metadata for the table, the metadata including a micro-partition expression property comprising information about data stored in a micro-partition of the table. The computing resource stores or manages at 1908 metadata for the table, the metadata including a grouping expression property comprising information about data stored in the micro-partition and one or more additional micro-partitions of the table. The computing resource stores or manages at 1910 metadata for the table, the metadata including cumulative table metadata comprising global information about the plurality of micro-partitions of the table.

Figure 20:
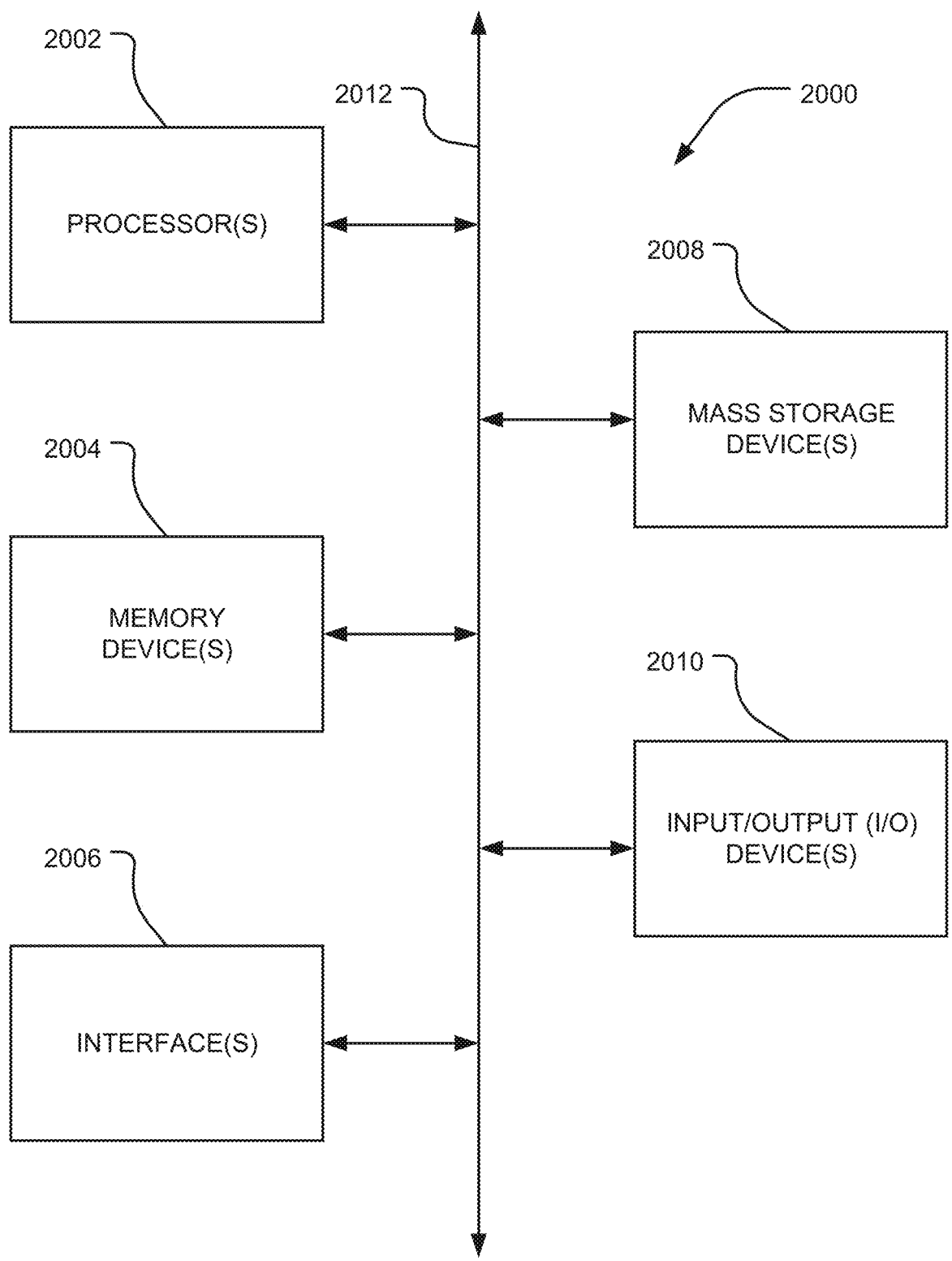
FIG. 20 is a block diagram of an example computing device, according to an example embodiment of the systems and methods described herein.

FIG. 20 is a block diagram depicting an example computing device 2000. In some embodiments, computing device 2000 is used to implement one or more of the systems and components discussed herein. For example, computing device 2000 may include or be part of a configuration and metadata manager 1622, a resource manager 1502, a processing platform 1500, and/or any other components or systems discussed herein. As another example, the components, systems, or platforms discussed herein may include one or more computing devices 2000. Further, computing device 2000 may interact with any of the systems and components described herein. Accordingly, computing device 2000 may be used to perform various procedures and tasks, such as those discussed herein. Computing device 2000 can function as a server, a client or any other computing entity. Computing device 2000 can be any of a wide variety of computing devices, such as a desktop computer, a notebook computer, a server computer, a handheld computer, a tablet, and the like.

Computing device 2000 includes one or more processor(s) 2002, one or more memory device(s) 2004, one or more interface(s) 2006, one or more mass storage device(s) 2008, and one or more Input/Output (I/O) device(s) 2010, all of which are coupled to a bus 2012. Processor(s) 2002 include one or more processors or controllers that execute instructions stored in memory device(s) 2004 and/or mass storage device(s) 2008. Processor(s) 2002 may also include various types of non-transitory computer-readable media, such as cache memory.

Memory device(s) 2004 include various non-transitory computer-readable media, such as volatile memory (e.g., random access memory (RAM)) and/or nonvolatile memory (e.g., read-only memory (ROM)). Memory device(s) 2004 may also include rewritable ROM, such as Flash memory.

Mass storage device(s) 2008 include various computer readable media, such as magnetic tapes, magnetic disks, optical disks, solid state memory (e.g., Flash memory), and so forth. Various drives may also be included in mass storage device(s) 2008 to enable reading from and/or writing to the various computer readable media. Mass storage device(s) 2008 include removable media and/or non-removable media.

I/O device(s) 2010 include various devices that allow data and/or other information to be input to or retrieved from computing device 2000. Example I/O device(s) 2010 include cursor control devices, keyboards, keypads, microphones, monitors or other display devices, speakers, printers, network interface cards, modems, lenses, CCDs or other image capture devices, and the like.

Interface(s) 2006 include various interfaces that allow computing device 2000 to interact with other systems, devices, or computing environments. Example interface(s) 2006 include any number of different network interfaces, such as interfaces to local area networks (LANs), wide area networks (WANs), wireless networks, and the Internet.

Bus 2012 allows processor(s) 2002, memory device(s) 2004, interface(s) 2006, mass storage device(s) 2008, and I/O device(s) 2010 to communicate with one another, as well as other devices or components coupled to bus 2012. Bus 2012 represents one or more of several types of bus structures, such as a system bus, PCI bus, IEEE bus, USB bus, and so forth.

The flow diagrams and block diagrams herein illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a non-transitory computer-readable medium that can direct a computer or other programmable data processing apparatus to function in a particular manner, such that the instructions stored in the non-transitory computer-readable medium produce an article of manufacture including instruction means which implement the function/act specified in the flow diagram and/or block diagram block or blocks.

The systems and methods described herein provide a flexible and scalable data warehouse using new data processing platforms, methods, systems, and algorithms. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

In the described systems and methods, a data storage system utilizes an SQL (Structured Query Language)-based relational database. However, these systems and methods are applicable to any type of database using any data storage architecture and using any language to store and retrieve data within the database. The systems and methods described herein may also provide a multi-tenant system that supports isolation of computing resources and data between different customers/clients and between different users within the same customer/client.

Various techniques, or certain aspects or portions thereof, may take the form of program code (i.e., instructions) embodied in tangible media, such as floppy diskettes, CD-ROMs, hard drives, a non-transitory computer readable storage medium, or any other machine readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

Examples of Embodiments

Following is a list of some examples of embodiments of systems and methods for adaptively enhancing query plans.

Example 1 is a system comprising: at least one processor; and a memory device including instructions, which when executed by the at least one processor, cause the at least one processor to perform operations comprising: receiving first metadata corresponding to a set of micro-partitions; generating second metadata for a grouping of the fast metadata; generating a first data structure including the first metadata and a second data structure including the second metadata, the second data structure including information associating the second metadata to the first metadata; and storing the first data structure and the second data structure in persistent storage as a first file and a second file.

Example 2 includes the subject matter of Example 1 wherein the memory device optionally includes further instructions, which when executed by the at least one processor, cause the at least one processor to perform further operations comprising: receiving a query on a table; analyzing the query against cumulative table metadata to determine whether data stored in the table matches the query; in response to determining that data stored in the table matches the query, loading and scanning the second file including the second metadata to determine groups of micro-partitions to load from the first file including the first metadata; loading and scanning the first metadata based at least in part on the determined groups of micro-partitions and determining a second set of micro-partitions to access for performing the query; and performing the query based on the second set of micro-partitions.

Example 3 includes the subject matter of any one of Examples 1 and 2, wherein the memory device optionally includes further instructions, which when executed by the at least one processor, cause the at least one processor to perform further operations comprising: evaluating the query against a particular grouping expression property from the second metadata to determine whether a particular micro-partition comprises data matching the query; and in response to determining that the particular micro-partition comprises data matching the query, evaluating the query, using the first metadata, against each of: a micro-partition expression property comprising information about the data stored in the particular micro-partition, and a micro-partition expression property comprising information about data stored in an additional micro-partition of one or more additional micro-partitions, to determine which of the particular micro-partition or the one or more additional micro-partitions comprises data matching the query Example 4 includes the subject matter of any one of Examples 1-3, wherein the memory device optionally includes further instructions, which when executed by the at least one processor, cause the at least one processor to perform further operations comprising: scanning each of the particular micro-partition or the one or more additional micro-partitions that comprises data matching the query to respond to the query.

Example 5 includes the subject matter of any one of Examples 1-4, wherein the file optionally comprises: a header, file metadata including a serialized list of metadata objects, expression properties for a first column, expression properties for a second column, expression properties for a first sub-column, and information for deleted global file references.

Example 6 includes the subject matter of any one of Examples 1-5, wherein the persistent storage is optionally provided by a network-based storage platform.

Example 7 includes the subject matter of any one of Examples 1-6, wherein the memory device optionally includes further instructions, which when executed by the at least one processor, cause the at least one processor to perform further operations comprising: storing database data in a table, the table comprising a plurality of micro-partitions each having rows and columns; and storing metadata for the table, the metadata comprising: a grouping expression property comprising information about data stored in the micro-partition and one or more additional micro-partitions of the table, and cumulative table metadata comprising global information about the plurality of micro-partitions of the table.

Example 8 includes the subject matter of any one of Examples 1-7 wherein the grouping expression property optionally comprises at least one of: a summary of database data collectively stored across the micro-partition and the one or more additional micro-partitions, a type of data collectively stored across the micro-partition and the one or more additional micro-partitions, or a global minimum and maximum for the data collectively stored across the micro-partition and the one or more additional micro-partitions.

Example 9 includes the subject matter of any one of Examples 1-8 wherein the cumulative table metadata is optionally stored in a metadata micro-partition associated with the table, the metadata micro-partition including information comprising at least one of: a version number, or a list of all added table data micro-partitions.

Example 10 includes the subject matter of any one of Examples 1-9 wherein the memory device optionally includes further instructions, which when executed by the at least one processor, cause the at least one processor to perform further operations comprising: caching the cumulative table metadata in a cache of at least one node of a resource manager, wherein the at least one node comprises a processor and the cache.

Example 11 is a method comprising: receiving first metadata corresponding to a set of micro-partitions; generating second metadata for a grouping of the first metadata; generating a first data structure including the first metadata and a second data structure including the second metadata, the second data structure including information associating the second metadata to the first metadata; and storing the first data structure and the second data structure in persistent storage as a first file and a second file.

Example 12 includes the subject matter of Example 11, further optionally comprising: receiving a query on a table; analyzing the query against cumulative table metadata to determine whether data stored in the table matches the query; in response to determining that data stored in the table matches the query, loading and scanning the second file including the second metadata to determine groups of micro-partitions to load from the first file including the first metadata; loading and scanning the first metadata based at least in part on the determined groups of micro-partitions and determining a second set of micro-partitions to access for performing the query; and performing the query based on the second set of micro-partitions.

Example 13 includes the subject matter of any one of Examples 11-12, further optionally comprising: evaluating the query against a particular grouping expression property from the second metadata to determine whether a particular micro-partition comprises data matching the query; in response to determining that the particular micro-partition comprises data matching the query, evaluating the query, using the first metadata, against each of: a micro-partition expression property comprising information about the data stored in the particular micro-partition, and a micro-partition expression property comprising information about data stored in an additional micro-partition of one or more additional micro-partitions, to determine which of the particular micro-partition or the one or more additional micro-partitions comprises data matching the query.

Example 14 includes the subject matter of any one of Examples 11-13, further optionally comprising: scanning each of the particular micro-partition or the one or more additional micro-partitions that comprises data matching the query to respond to the query.

Example 15 includes the subject matter of any one of Examples 11-14, wherein the file optionally comprises: a header, file metadata including a serialized list of metadata objects, expression properties for a first column, expression properties for a second column, expression properties for a first sub-column, and information for deleted global file references.

Example 16 includes the subject matter of any one of 11-15, wherein the persistent storage is optionally provided by a network-based storage platform.

Example 17 includes the subject matter of any one of 11-16 further optionally comprising: storing database data in a table, the table comprising a plurality of micro-partitions each having rows and columns; and storing metadata for the table, the metadata comprising: a grouping expression property comprising information about data stored in the micro-partition and one or more additional micro-partitions of the table, and cumulative table metadata comprising global information about the plurality of micro-partitions of the table.

Example 18 includes the subject matter of any one of 11-17 wherein the grouping expression property optionally comprises at least one of: a summary of database data collectively stored across the micro-partition and the one or more additional micro-partitions, a type of data collectively stored across the micro-partition and the one or more additional micro-partitions, or a global minimum and maximum for the data collectively stored across the micro-partition and the one or more additional micro-partitions.

Example 19 includes the subject matter of any one of 11-18 wherein the cumulative table metadata is optionally stored in a metadata micro-partition associated with the table, the metadata micro-partition including information comprising at least one of: a version number, or a list of all added table data micro-partitions.

Example 20 includes the subject matter of any one of 11-19 further optionally comprising: caching the cumulative table metadata in a cache of at least one node of a resource manager, wherein the at least one node comprises a processor and the cache.

Example 21 is a non-transitory computer-readable medium comprising instructions that, when executed by at least one processor, configure the at least one processor to perform operations comprising: receiving first metadata corresponding to a set of micro-partitions; generating second metadata for a grouping of the first metadata; generating a first data structure including the first metadata and a second data structure including the second metadata, the second data structure including information associating the second metadata to the first metadata; and storing the first data structure and the second data structure in persistent storage as a first file and a second file.

Example 22 includes the subject matter of Example 21, wherein the non-transitory computer-readable medium optionally comprises further instructions, which when executed by the at least one processor, further cause the at least one processor to perform further operations comprising: receiving a query on a table; analyzing the query against cumulative table metadata to determine whether data stored in the table matches the query; in response to determining that data stored in the table matches the query, loading and scanning the second file including the second metadata to determine groups of micro-partitions to load from the first file including the first metadata; loading and scanning the first metadata based at least in part on the determined groups of micro-partitions and determining a second set of micro-partitions to access for performing the query; and performing the query based on the second set of micro-partitions.

Example 23 includes the subject matter of any one of Examples 21-22, wherein the non-transitory computer-readable medium optionally comprises further instructions, which when executed by the at least one processor, further cause the at least one processor to perform further operations comprising: evaluating the query against a particular grouping expression property from the second metadata to determine whether a particular micro-partition comprises data matching the query; in response to determining that the particular micro-partition comprises data matching the query, evaluating the query, using the first metadata, against each of: a micro-partition expression property comprising information about the data stored in the particular micro-partition, and a micro-partition expression property comprising information about data stored in an additional micro-partition of one or more additional micro-partitions, to determine which of the particular micro-partition or the one or more additional micro-partitions comprises data matching the query.

Example 24 includes the subject matter of any one of Examples 21-23, wherein the non-transitory computer-readable medium optionally comprises further instructions, which when executed by the at least one processor, further cause the at least one processor to perform further operations comprising: scanning each of the particular micro-partition or the one or more additional micro-partitions that comprises data matching the query to respond to the query.

Example 25 includes the subject matter of any one of Examples 21-24, wherein the file optionally comprises: a header, file metadata including a serialized list of metadata objects, expression properties for a first column, expression properties for a second column, expression properties for a first sub-column, and information for deleted global file references.

Example 26 includes the subject matter of any one of Examples 21-25, wherein the persistent storage is optionally provided by a network-based storage platform.

Example 27 includes the subject matter of any one of Examples 21-26, wherein the non-transitory computer-readable medium optionally comprises further instructions, which when executed by the at least one processor, further cause the at least one processor to perform further operations optionally comprising: storing database data in a table, the table comprising a plurality of micro-partitions each having rows and columns; and storing metadata for the table, the metadata comprising: a grouping expression property comprising information about data stored in the micro-partition and one or more additional micro-partitions of the table, and cumulative table metadata comprising global information about the plurality of micro-partitions of the table.

Example 28 includes the subject matter of any one of Examples 21-27, wherein the grouping expression property optionally comprises at least one of: a summary of database data collectively stored across the micro-partition and the one or more additional micro-partitions, a type of data collectively stored across the micro-partition and the one or more additional micro-partitions, or a global minimum and maximum for the data collectively stored across the micro-partition and the one or more additional micro-partitions.

Example 29 includes the subject matter of any one of Examples 21-28, wherein the cumulative table metadata is optionally stored in a metadata micro-partition associated with the table, the metadata micro-partition including information comprising at least one of: a version number, or a list of all added table data micro-partitions.

Example 30 includes the subject matter of any one of Examples 21-29, wherein the non-transitory computer-readable medium optionally comprises further instructions, which when executed by the at least one processor, further cause the at least one processor to perform further operations comprising: caching the cumulative table metadata in a cache of at least one node of a resource manager, wherein the at least one node comprises a processor and the cache.

Conclusion

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseam in this disclosure.

In the present disclosure, various terminology is used in accordance with provided definitions. Furthermore, it is noted in connection with the definitions set out herein that the defined terms and phrases as used herein include the provided definitions along with any general and conventional understandings of the meaning of the term or phrase.

It is further noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

Many of the functional units described in this specification may be implemented as one or more components, which is a term used to more particularly emphasize their implementation independence. For example, a component may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays (FPGAs), programmable array logic, programmable logic devices, and/or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary in addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

What is claimed is:

1. A system comprising:
    at least one processor; and
    a memory device including instructions, which when executed by the at least one processor, cause the at least one processor to perform operations comprising:
    generating a first data structure including first metadata and a second data structure including second metadata, the first metadata corresponding to a set of micro-partitions, the second metadata for a grouping of the first metadata, the second data structure including information associating the second metadata to the first metadata;
    storing the first data structure and the second data structure in storage as a first file and a second file; and
    storing third metadata for a table, the third metadata comprising:
    cumulative table metadata comprising global information about a plurality of micro-partitions of the table, the cumulative table metadata being stored in a single metadata micro-partition associated with the table, the single metadata micro-partition being separate from the plurality of micro-partitions of the table, the single metadata micro-partition including information comprising at least a list of deleted table data micro-partitions.

2. The system of claim 1, wherein the single metadata micro-partition is stored in immutable storage, the immutable storage comprises a storage device that cannot be updated in-place and the operations further comprise:
    receiving first metadata corresponding to the set of micro-partitions; and
    generating second metadata for the grouping of the first metadata.

3. The system of claim 1, wherein the single metadata micro-partition includes further information comprising information about each added table data micro-partition, the information includes a micro-partition path, micro-partition size, micro-partition key identifier, and a summary of rows and columns that are stored in the table data micro-partition.

4. The system of claim 1, wherein the operations further comprise:
    receiving a query on a table;
    analyzing the query against the cumulative table metadata to determine whether data stored in the table matches the query; and
    in response to determining that data stored in the table matches the query, loading and scanning the second file including the second metadata to determine groups of micro-partitions to load from the first file including the first metadata.

5. The system of claim 4, wherein the operations further comprise:
   loading and scanning the first metadata based at least in part on the determined groups of micro-partitions and determining a second set of micro-partitions to access for performing the query; and
   performing the query based on the second set of micro-partitions.

6. The system of claim 4, wherein the operations further comprise:
   evaluating the query against a particular grouping expression property from the second metadata to determine whether a particular micro-partition comprises data matching the query; and
   in response to determining that the particular micro-partition comprises data matching the query, evaluating the query, using the first metadata, against each of:
   a micro-partition expression property comprising information about the data stored in the particular micro-partition, and
   a micro-partition expression property comprising information about data stored in an additional micro-partition of one or more additional micro-partitions, to determine which of the particular micro-partition or the one or more additional micro-partitions comprises data matching the query.

7. The system of claim 6, wherein the memory device includes further instructions, which when executed by the at least one processor, cause the at least one processor to perform further operations comprising:
   scanning each of the particular micro-partition or the one or more additional micro-partitions that comprises data matching the query to respond to the query.

8. The system of claim 1, wherein the operations further comprise:
   storing database data in a table, the table comprising a plurality of micro-partitions each having rows and columns; and
   storing metadata for the table, the metadata comprising:
   a grouping expression property comprising information about data stored in the micro-partition and one or more additional micro-partitions of the table.

9. The system of claim 8, wherein the grouping expression property comprises at least one of:
   a summary of database data collectively stored across the micro-partition and the one or more additional micro-partitions,
   a type of data collectively stored across the micro-partition and the one or more additional micro-partitions, or
   a global minimum and maximum for the data collectively stored across the micro-partition and the one or more additional micro-partitions.

10. The system of claim 1, wherein the operations further comprise:
    caching the cumulative table metadata in a cache of at least one node of a resource manager, wherein the at least one node comprises a processor and the cache.

11. A method comprising:
    generating a first data structure including first metadata and a second data structure including second metadata, the first metadata corresponding to a set of micro-partitions, the second metadata for a grouping of the first metadata, the second data structure including information associating the second metadata to the first metadata;
    storing the first data structure and the second data structure in storage as a first file and a second file; and
    storing third metadata for a table, the third metadata comprising:
    cumulative table metadata comprising global information about a plurality of micro-partitions of the table, the cumulative table metadata being stored in a single metadata micro-partition associated with the table, the single metadata micro-partition being separate from the plurality of micro-partitions of the table, the single metadata micro-partition including information comprising at least a list of deleted table data micro-partitions.

12. The method of claim 11, further comprising:
    receiving first metadata corresponding to the set of micro-partitions; and
    generating second metadata for the grouping of the first metadata.

13. The method of claim 11, wherein the single metadata micro-partition includes further information comprising information about each added table data micro-partition, the information includes a micro-partition path, micro-partition size, micro-partition key identifier, and a summary of rows and columns that are stored in the table data micro-partition.

14. The method of claim 11, further comprising:
    receiving a query on a table;
    analyzing the query against the cumulative table metadata to determine whether data stored in the table matches the query; and
    in response to determining that data stored in the table matches the query, loading and scanning the second file including the second metadata to determine groups of micro-partitions to load from the first file including the first metadata.

15. The method of claim 14, further comprising:
    loading and scanning the first metadata based at least in part on the determined groups of micro-partitions and determining a second set of micro-partitions to access for performing the query; and
    performing the query based on the second set of micro-partitions.

16. The method of claim 14, further comprising:
    evaluating the query against a particular grouping expression property from the second metadata to determine whether a particular micro-partition comprises data matching the query; and
    in response to determining that the particular micro-partition comprises data matching the query, evaluating the query, using the first metadata, against each of:
    a micro-partition expression property comprising information about the data stored in the particular micro-partition, and
    a micro-partition expression property comprising information about data stored in an additional micro-partition of one or more additional micro-partitions, to determine which of the particular micro-partition or the one or more additional micro-partitions comprises data matching the query.

17. The method of claim 16, further comprising:
    scanning each of the particular micro-partition or the one or more additional micro-partitions that comprises data matching the query to respond to the query.

18. The method of claim 11, further comprising:
    storing database data in a table, the table comprising a plurality of micro-partitions each having rows and columns; and storing metadata for the table, the metadata comprising:
a grouping expression property comprising information about data stored in the micro-partition and one or more additional micro-partitions of the table.

19. The method of claim 18, wherein the grouping expression property comprises at least one of:
a summary of database data collectively stored across the micro-partition and the one or more additional micro-partitions,
a type of data collectively stored across the micro-partition and the one or more additional micro-partitions, or
a global minimum and maximum for the data collectively stored across the micro-partition and the one or more additional micro-partitions.

20. The method of claim 11, further comprising:
caching the cumulative table metadata in a cache of at least one node of a resource manager, wherein the at least one node comprises a processor and the cache.

21. A non-transitory computer-readable medium comprising instructions that, when executed by at least one processor, configure the at least one processor to perform operations comprising:
generating a first data structure including first metadata and a second data structure including second metadata, the first metadata corresponding to a set of micro-partitions, the second metadata for a grouping of the first metadata, the second data structure including information associating the second metadata to the first metadata;
storing the first data structure and the second data structure in storage as a first file and a second file; and
storing third metadata for a table, the third metadata comprising:
cumulative table metadata comprising global information about a plurality of micro-partitions of the table, the cumulative table metadata being stored in a single metadata micro-partition associated with the table, the single metadata micro-partition being separate from the plurality of micro-partitions of the table, the single metadata micro-partition including information comprising at least a list of deleted table data micro-partitions.

22. The non-transitory computer-readable medium of claim 21, wherein the operations further comprise:
receiving first metadata corresponding to the set of micro-partitions; and
generating second metadata for the grouping of the first metadata.

23. The non-transitory computer-readable medium of claim 21, wherein the single metadata micro-partition includes further information comprising information about each added table data micro-partition, the information includes a micro-partition path, micro-partition size, micro-partition key identifier, and a summary of rows and columns that are stored in the table data micro-partition.

24. The non-transitory computer-readable medium of claim 21, wherein the operations further comprise:
receiving a query on a table;
analyzing the query against the cumulative table metadata to determine whether data stored in the table matches the query; and in response to determining that data stored in the table matches the query, loading and scanning the second file including the second metadata to determine groups of micro-partitions to load from the first file including the first metadata.

25. The non-transitory computer-readable medium of claim 24, wherein the operations further comprise:
loading and scanning the first metadata based at least in part on the determined groups of micro-partitions and determining a second set of micro-partitions to access for performing the query; and
performing the query based on the second set of micro-partitions.

26. The non-transitory computer-readable medium of claim 24, wherein the operations further comprise:
evaluating the query against a particular grouping expression property from the second metadata to determine whether a particular micro-partition comprises data matching the query; and
in response to determining that the particular micro-partition comprises data matching the query, evaluating the query, using the first metadata, against each of:
a micro-partition expression property comprising information about the data stored in the particular micro-partition, and
a micro-partition expression property comprising information about data stored in an additional micro-partition of one or more additional micro-partitions, to determine which of the particular micro-partition or the one or more additional micro-partitions comprises data matching the query.

27. The non-transitory computer-readable medium of claim 26, wherein the operations further comprise:
scanning each of the particular micro-partition or the one or more additional micro-partitions that comprises data matching the query to respond to the query.

28. The non-transitory computer-readable medium of claim 21, wherein the operations further comprise:
storing database data in a table, the table comprising a plurality of micro-partitions each having rows and columns; and
storing metadata for the table, the metadata comprising:
a grouping expression property comprising information about data stored in the micro-partition and one or more additional micro-partitions of the table.

29. The non-transitory computer-readable medium of claim 28, wherein the grouping expression property comprises at least one of:
a summary of database data collectively stored across the micro-partition and the one or more additional micro-partitions,
a type of data collectively stored across the micro-partition and the one or more additional micro-partitions, or
a global minimum and maximum for the data collectively stored across the micro-partition and the one or more additional micro-partitions.

30. The non-transitory computer-readable medium of claim 21, wherein the operations further comprise:
caching the cumulative table metadata in a cache of at least one node of a resource manager, wherein the at least one node comprises a processor and the cache.

* * * * *